US012456087B2

(12) United States Patent
Nagel et al.

(10) Patent No.: US 12,456,087 B2
(45) Date of Patent: Oct. 28, 2025

(54) METHODS AND APPARATUS FOR THE FORMATTING OF DATA VALUES THAT MAY BE ARBITRARY OR INDETERMINATE COLLECTED FROM A PLURALITY OF SOURCES

(71) Applicant: QVINCI SOFTWARE, LLC, Austin, TX (US)

(72) Inventors: Charles Brenton Nagel, Dale, TX (US); Jason Alexander Hooten, Round Rock, TX (US); James Wesley Byrne, Austin, TX (US)

(73) Assignee: Qvinci Software, LLC, Austin, TX (US)

( * ) Notice: Subject to any disclaimer, the term of this patent is extended or adjusted under 35 U.S.C. 154(b) by 65 days.

(21) Appl. No.: 18/132,179

(22) Filed: Apr. 7, 2023

(65) Prior Publication Data

US 2023/0316206 A1    Oct. 5, 2023

Related U.S. Application Data

(62) Division of application No. 15/711,905, filed on Sep. 21, 2017, now Pat. No. 11,625,662.

(Continued)

(51) Int. Cl.
*G06Q 10/0639* (2023.01)
*G06F 16/25* (2019.01)
*G06F 21/62* (2013.01)

(52) U.S. Cl.
CPC ..... *G06Q 10/06393* (2013.01); *G06F 16/258* (2019.01); *G06F 21/6254* (2013.01)

(58) Field of Classification Search
CPC ............ G06Q 10/06393; G06F 16/258; G06F 21/6254

(Continued)

(56) References Cited

U.S. PATENT DOCUMENTS 5,173,853 A    12/1992    Kelly et al.
5,392,390 A    2/1995    Crozier
(Continued)

FOREIGN PATENT DOCUMENTS

JP    2017182749 A    * 10/2017

OTHER PUBLICATIONS

Rana Faisal Munir, Oscar Romero, Alberto Abell'o, Besim Bilalli, MaikThiele, and Wolfgang Lehner. ResilientStore: A Heuristicbased Data Format Selector for Intermediate Results. Universitat Politecnica de Catalunya (UPC), Barcelona, Spain, 2016 (Year: 2016).

(Continued)

*Primary Examiner* — Abdallah A El-Hage Hassan
(74) *Attorney, Agent, or Firm* — Garson & Gutierrez, PC

(57) ABSTRACT

Methods and apparatus for the formatting of data values that may be arbitrary or indeterminate collected from a plurality of sources are provided. In one embodiment, a centralized web application is accessed by an administrative user to create and distribute a standardized chart of accounts for normalization, collection, and storage of data from units associated with the multi-unit organization. The stored standardized chart of accounts data is selectively identified, filtered, anonymized, excluded/hidden from view, manipulated and/or other various calculations are performed in order to carry out data analyses and other operations. Such apparatus and methods enable abstraction of useful information from the collected and stored chart of accounts data across a range of units having similar and varying characteristics.

14 Claims, 11 Drawing Sheets

Related U.S. Application Data

(60) Provisional application No. 62/398,385, filed on Sep. 22, 2016, provisional application No. 62/398,392, filed on Sep. 22, 2016.

(58) Field of Classification Search
USPC ........................................................ 705/7.39
See application file for complete search history.

(56) References Cited

U.S. PATENT DOCUMENTS

| | | | |
|---|---|---|---|
| 5,893,131 | A | 4/1999 | Kornfeld |
| 6,101,539 | A | 8/2000 | Kennely et al. |
| 6,141,664 | A | 10/2000 | Boothby |
| 6,185,576 | B1 | 2/2001 | McIntosh |
| 6,397,232 | B1 | 5/2002 | Cheng-Hung et al. |
| 6,411,938 | B1 | 6/2002 | Gates et al. |
| 6,477,545 | B1 | 11/2002 | Larue |
| 6,751,663 | B1 | 6/2004 | Farrell et al. |
| 6,785,689 | B1 | 8/2004 | Daniel et al. |
| 6,850,950 | B1 | 2/2005 | Clarke et al. |
| 6,954,766 | B2 | 10/2005 | Ouchi |
| 7,120,597 | B1 | 10/2006 | Knudtzon et al. |
| 7,401,101 | B2 | 7/2008 | Hild et al. |
| 7,451,103 | B1 | 11/2008 | Boyle et al. |
| 7,490,108 | B2 | 2/2009 | Bruun |
| 7,539,701 | B2 | 5/2009 | Sethi |
| 7,580,884 | B2 | 8/2009 | Cook |
| 7,725,817 | B2 | 5/2010 | Krasun et al. |
| 7,885,868 | B2 | 2/2011 | Nault |
| 8,214,329 | B2 | 7/2012 | Gilder et al. |
| 8,255,790 | B2 | 8/2012 | Francker et al. |
| 8,560,568 | B2 | 10/2013 | Gilder et al. |
| 8,751,464 | B1 | 6/2014 | Weiss et al. |
| 9,009,098 | B1* | 4/2015 | Hushon ................. G06F 16/254 707/602 |
| 9,020,946 | B2 | 4/2015 | Nagel et al. |
| 9,411,864 | B2 | 8/2016 | Gilder et al. |
| 9,483,799 | B2 | 11/2016 | Nagel et al. |
| 9,508,087 | B1 | 11/2016 | Liu et al. |
| 10,489,373 | B1 | 11/2019 | Alda |
| 10,963,541 | B2* | 3/2021 | Cronin ................. G06F 16/2471 |
| 2002/0052791 | A1 | 5/2002 | Defede et al. |
| 2002/0052893 | A1 | 5/2002 | Grobler et al. |
| 2002/0138375 | A1 | 9/2002 | Kane et al. |
| 2003/0005426 | A1 | 1/2003 | Sholtens et al. |
| 2003/0126056 | A1 | 7/2003 | Hausman et al. |
| 2003/0158924 | A1 | 8/2003 | Delegge |
| 2003/0163403 | A1 | 8/2003 | Chen et al. |
| 2003/0216979 | A1 | 11/2003 | Sribhibhadh et al. |
| 2004/0068526 | A1 | 4/2004 | Singh |
| 2004/0143522 | A1 | 7/2004 | Wall et al. |
| 2004/0181753 | A1 | 9/2004 | Michaelides |
| 2004/0199369 | A1 | 10/2004 | Freidman et al. |
| 2004/0205621 | A1 | 10/2004 | Johnson et al. |
| 2004/0205647 | A1 | 10/2004 | Smith |
| 2005/0022154 | A1 | 1/2005 | Chung et al. |
| 2005/0055324 | A1 | 3/2005 | Godeby et al. |
| 2005/0060135 | A1* | 3/2005 | Gauckler ................. G06F 30/00 703/22 |
| 2005/0086199 | A1 | 4/2005 | Champagne et al. |
| 2005/0144096 | A1 | 6/2005 | Caramanna et al. |
| 2005/0154628 | A1 | 7/2005 | Eckart et al. |
| 2005/0154635 | A1 | 7/2005 | Wright et al. |
| 2005/0197931 | A1 | 9/2005 | Gupta |
| 2005/0216497 | A1 | 9/2005 | Kruse et al. |
| 2005/0240467 | A1 | 10/2005 | Eckart et al. |
| 2006/0004845 | A1 | 1/2006 | Kristiansen et al. |
| 2006/0064428 | A1 | 3/2006 | Colaco et al. |
| 2006/0193264 | A1 | 8/2006 | Bonar et al. |
| 2007/0078877 | A1 | 4/2007 | Ungar et al. |
| 2007/0101437 | A1 | 5/2007 | Yamamoto et al. |
| 2007/0150385 | A1 | 6/2007 | Ode |
| 2007/0150806 | A1 | 6/2007 | Hartmann |
| 2007/0174482 | A1 | 7/2007 | Yajima |
| 2007/0214179 | A1* | 9/2007 | Hoang ................. G06F 16/2428 |
| 2007/0237427 | A1 | 10/2007 | Patel et al. |
| 2007/0260571 | A1 | 11/2007 | Mansfield et al. |
| 2007/0277090 | A1 | 11/2007 | Raja et al. |
| 2008/0201246 | A1 | 8/2008 | Casey et al. |
| 2008/0222189 | A1 | 9/2008 | Ovanesyan et al. |
| 2008/0250157 | A1 | 10/2008 | Ohata |
| 2008/0306986 | A1 | 12/2008 | Doyle, Sr. |
| 2009/0037356 | A1 | 2/2009 | Rothstein et al. |
| 2009/0150223 | A1 | 6/2009 | Sachedina |
| 2009/0187496 | A1 | 7/2009 | Edens |
| 2009/0201294 | A1 | 8/2009 | Hayes |
| 2009/0204517 | A1 | 8/2009 | Edens et al. |
| 2009/0222470 | A1 | 9/2009 | Kemp et al. |
| 2009/0234885 | A1 | 9/2009 | Yotsokura |
| 2009/0276340 | A1 | 11/2009 | Knapp |
| 2009/0313208 | A1 | 12/2009 | Helfman |
| 2010/0057783 | A1 | 3/2010 | Huang |
| 2010/0107085 | A1 | 4/2010 | Chadwick et al. |
| 2010/0125616 | A1 | 5/2010 | Groth |
| 2010/0179940 | A1 | 7/2010 | Gilder et al. |
| 2010/0205076 | A1 | 8/2010 | Parson et al. |
| 2010/0318572 | A1 | 12/2010 | Ng et al. |
| 2011/0173294 | A1 | 7/2011 | Jackson |
| 2011/0258091 | A1 | 10/2011 | Wilson et al. |
| 2012/0011123 | A1 | 1/2012 | Nagel et al. |
| 2012/0095873 | A1 | 4/2012 | Narang et al. |
| 2012/0203676 | A1 | 8/2012 | Chou |
| 2012/0259872 | A1 | 10/2012 | Sengupta et al. |
| 2012/0265655 | A1 | 10/2012 | Stroh |
| 2012/0266094 | A1 | 10/2012 | Starr et al. |
| 2013/0046661 | A1 | 2/2013 | Levin |
| 2013/0173539 | A1 | 7/2013 | Gilder et al. |
| 2013/0191328 | A1 | 7/2013 | Hackmann et al. |
| 2013/0232042 | A1 | 9/2013 | Simpson et al. |
| 2013/0265592 | A1 | 10/2013 | Bellagamba |
| 2013/0290837 | A1 | 10/2013 | Hudetz |
| 2014/0006244 | A1 | 1/2014 | Crowley et al. |
| 2014/0013204 | A1 | 1/2014 | Theis et al. |
| 2014/0101007 | A1 | 4/2014 | Nagel |
| 2014/0101456 | A1 | 4/2014 | Meunier et al. |
| 2014/0136398 | A1 | 5/2014 | Nagel et al. |
| 2014/0173402 | A1 | 6/2014 | Bastide et al. |
| 2014/0250368 | A1* | 9/2014 | Wineman ................. G06F 40/174 715/235 |
| 2014/0330620 | A1 | 11/2014 | Abella et al. |
| 2015/0222489 | A1 | 8/2015 | Perez Martinez et al. |
| 2015/0347624 | A1* | 12/2015 | Villars ................. G06F 16/9024 705/7.29 |
| 2016/0103920 | A1 | 4/2016 | Lee et al. |
| 2016/0162920 | A1 | 6/2016 | Kemmer et al. |
| 2016/0283584 | A1* | 9/2016 | Dubost ................. G06F 16/217 |
| 2017/0243150 | A1 | 8/2017 | Dave |

OTHER PUBLICATIONS

Sri Harsha Allarnraju and Robert Chun Enhancing Document Clustering through Heuristics and Sununary-Based Pre-processing. San Jose State University, Department of Computer Science, San Jose, CA 95192. 2009. (Year: 2009).

A fast and efficient Hanuning LSH-based scheme for accurate linkage. CrossMark, Know! Inf Syst (2016) 49: 861-884 DOI 10.1007 / sl0115-016-0919-y. Year 2016. (Year: 2016).

Dictionary.com, Definition for "sub" prefix; Printed Dec. 20, 2017 (Year. 2017).

Atkins-Need help understanding import options [Posted at GnuCash SYN/CVS and Mail Archive Server]. [retrieved on Feb. 8, 2012]. Retrieved from the Internet:< URL: http://lists.gnucash.org/pipermailignucash-user/2009-June/030103 .html> Jun. 4, 2009 entire document.

ChiefMechanic—Can I Merge 2 General Ledger Accounts? [Posted at QBGarage.com]. [retrieved on Feb. 8, 2012]. Retrieved from the Internet:< URL: http://www.qbgarage.com/blog/can-i-merge-2-general-ledger-accounts/print/> Sep. 5, 2010 entire document.

Ivens et al.—QuickBooks 2007 The Official Guide [retrieved on Feb. 8, 2012]. Retrieved from the Internet:< URL: http://books.

(56) References Cited

OTHER PUBLICATIONS google.com/books?id~wACFGD3clfoC&pg~PA32&dq~sub+sub+account+quickbooks&h 1 ~en&sa~X&ei~IM4yT9jklMuLsAK098mCBw&ved~OCEMQ6AEwAQ#Fonepage&q&f~faise> 2007 (2007) ISBN-13978-0-07-226345-9 entire document.

(IVENS) Running QuickBooks 2007 Premier Editions [retrieved on Feb. 8, 2012]. Retrieved from the Internet:< URL: http://books.google.com/books?id~WbQ55tZH3JsC&pg~PA62&dq~mapping+account+( subaccount +% 7C +subaccounts )+type+name&h!&sa~X&ei~E50xT7uiF9KisQKyqaWIBw&ved~OCDYQ6AEwAA#Fonepage&q~mapping%20account%20(subaccount%20%7C%20subaccounts )%20type%20name&f=false> 2007 (2007) ISBN 978-1-932925-00-5 entire document.

Bakke, E., et al., "Automatic Layout of Structured Hierarchical Reports", IEEE Transactions on Visualization and Computer Graphics, vol. 19, No. 12, Dec. 2013, pp. 2586-2595.

\* cited by examiner

| Account Name | May-15 | Jun-15 | Jul-15 | Total '15 |
|---|---|---|---|---|
| Ordinary Income/Expense | | | | |
| Income | | | | |
| Unmapped | 786,949 | 1,159,010 | 899,760 | 2,845,719 |
| Engine Sales | 2,405,977 | 3,346,727 | 379,859 | 6,132,563 |
| Engine Work | 2,227 | 51,954 | 2,227 | 56,408 |
| Loyalty & Discount | 0 | 0 | 0 | 0 |
| MSC Parts Income | 11,170,234 | 15,231,428 | 9,276,073 | 35,677,735 |
| Service Income | 33 | 567 | 9999 | 10,599 |
| Misc Service | 463,841 | 494,417 | 447,016 | 1,395,274 |
| Total Service Income | 14,819,261 | 20,284,103 | 11,014,934 | 46,118,298 |

FIG. 9

| Account Name | May-15 | Jun-15 | Jul-15 | Total '15 |
|---|---|---|---|---|
| Ordinary Income/Expense | | | | |
| Income | | | | |
| Unmapped | 786,949 | 1,159,010 | 899,760 | 2,845,719 |
| Engine Sales | 2,405,977 | 3,346,727 | 379,859 | 6,132,563 |
| Engine Work | 2,227 | 51,954 | 2,227 | 56,408 |
| Nissan Sales | 33,098 | 33,068 | 34,800 | 46,957 |
| Toyota Sales | 13,000 | 23,456 | 45,382 | 34,255 |
| Loyalty & Discount | 0 | 0 | 0 | 0 |
| MSC Parts Income | 11,170,234 | 15,231,428 | 9,276,073 | 35,677,735 |
| | | | | |
| Misc Service | 463,841 | 494,417 | 447,016 | 1,395,274 |
| Total Service Income | 14,870,906 | 20,343,527 | 11,089,852 | 46,201,789 |

FIG. 10

| Account Name | May-15 | Jun-15 | Jul-15 | Total '15 |
|---|---|---|---|---|
| Ordinary Income/Expense | | | | |
| Income | | | | |
| Unmapped | 786,849 | 1,158,010 | 888,760 | 2,845,719 |
| Engine Sales | 2,405,977 | 3,345,727 | 378,859 | 6,132,563 |
| Engine Work | 2,227 | 51,954 | 2,227 | 56,408 |
| Nissan Sales | 33,000 | 33,000 | 34,000 | 45,067 |
| Toyota Sales | 13,000 | 23,456 | 45,362 | 34,256 |
| Loyalty & Discount | 0 | 0 | 0 | 0 |
| MISC Parts Income | 11,170,234 | 15,231,428 | 9,276,073 | 35,677,735 |
| Service Income | 33 | 667 | 9999 | 10,699 |
| Misc Service | 453,841 | 494,417 | 447,016 | 1,395,274 |
| Total Service Income | 14,865,261 | 20,340,659 | 11,084,296 | 46,197,620 |

FIG. 11

| | Budget vs Actual by Location - YTD | | |
|---|---|---|---|
| Account Name | Loc 1 P&L | Loc 1 Budget | Loc 1 Diff |
| Ordinary Income/Expense | | | |
| Income | | | |
| Unmapped | 786,849 | 1,158,010 | -372,061 |
| Engine Sales | 2,405,977 | 3,346,727 | -940,750 |
| Engine Work | 2,227 | 51,954 | -49,727 |
| Loyalty & Discount | 0 | 0 | 0 |
| MISC Parts Income | 11,170,234 | 15,231,428 | -4,061,194 |
| Service Income | 33 | 667 | -634 |
| Misc Service | 453,841 | 494,417 | -40,576 |
| Total Service Income | 14,819,261 | 20,284,103 | -5,464,842 |

FIG. 12

| Account Name | Loc 1 P&L | Loc 1 Budget | Loc 1 Diff | Loc 2 P&L | Loc 3 P&L |
|---|---|---|---|---|---|
| Ordinary Income/Expense | | | | | |
| Income | | | | | |
| Unmapped | 786,849 | 1,159,010 | -372,061 | 786,269 | 786,864 |
| Engine Sales | 2,405,977 | 3,346,727 | -940,750 | 2,407,327 | 2,407,082 |
| Engine Work | 2,227 | 51,954 | -49,727 | 3,577 | 4,132 |
| Loyalty & Discount | 0 | 0 | 0 | 0 | 585 |
| MISC Parts Income | 11,170,234 | 15,231,428 | -4,061,194 | 11,171,584 | 11,172,139 |
| Service Income | 33 | 967 | -934 | 1,383 | 1,938 |
| Misc Service | 453,841 | 494,417 | -40,576 | 456,101 | 456,746 |
| Total Service Income | 14,819,201 | 20,284,103 | -5,464,842 | 14,827,361 | 14,831,246 |

METHODS AND APPARATUS FOR THE FORMATTING OF DATA VALUES THAT MAY BE ARBITRARY OR INDETERMINATE COLLECTED FROM A PLURALITY OF SOURCES

PRIORITY AND RELATED APPLICATIONS

This application is a divisional of, and claims the benefit of priority to, U.S. patent application Ser. No. 15/711,905 filed Sep. 21, 2017 entitled "Methods and Apparatus for the Analyzing, Manipulating, Formatting, Templating, Styling and/or Publishing of Data Collected from a Plurality of Sources", which claims the benefit of priority to both U.S. Provisional Patent Application Ser. No. 62/398,392 filed Sep. 22, 2016 and entitled "Methods and Apparatus for the Translation of Arbitrary Data into a Standardized Format"; and U.S. Provisional Patent Application Ser. No. 62/398,385 filed Sep. 22, 2016 and entitled "Methods and Apparatus for Analyses of Data Collected from Units within a Multi-Unit Organization", each of the foregoing being incorporated herein by reference in its entirety.

This application is related to U.S. patent application Ser. No. 14/697,467 filed Apr. 27, 2015 entitled "Methods and Apparatus for the Aggregation of Data", which is a continuation of and claims priority to U.S. patent application Ser. No. 12/834,791 filed Jul. 12, 2010 entitled "System and Method for Compilation of QuickBooks Accounts Data", now U.S. Pat. No. 9,020,946; U.S. patent application Ser. No. 12/944,702 filed Nov. 11, 2010 entitled "System and Method for Consolidating Account Data"; and U.S. patent application Ser. No. 14/043,731 filed Oct. 1, 2013 entitled "Methods and Apparatus for Providing Data Normalization, Scalability and Maintainability", which claims the benefit of priority to U.S. Provisional Patent Application 61/709,495 filed Oct. 4, 2012 entitled "Charts of Accounts Normalization, Scalability and Maintainability", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of data collection and analyses systems, and more particularly, in one exemplary embodiment, to providing analyses of data collected from sub-units within a multi-unit organization.

2. Description of Related Technology

Various accounting software programs exist in the prior art. For example, U.S. Pat. No. 9,020,946 (hereinafter, "the '946 Patent") assigned to the assignee hereof describes systems and methods for the compilation of accounting data. The '946 Patent describes, inter alia, methods and apparatus for the aggregation of accounting data from a plurality of physically separate locations. In one embodiment, it accomplishes the foregoing by assigning a different parent account identification number to each of a plurality of differently named parent accounts. An entry in a hash table is created for each of the parent account identification numbers with the contents of entries being a collection of rows including a row for each different sub account of the parent account. Likewise, an identifier is further assigned to each sub account of each parent account. Data associated with like named parent accounts, and like named sub accounts associated with these parent accounts, are subsequently aggregated together.

U.S. patent application Ser. No. 12/944,702 (hereinafter, "the '702 Application") assigned to the assignee hereof describes, inter alia, systems and methods for the consolidation of accounting data. The '702 Application describes embodiments where each of a plurality of accounting files is mapped to a set of standardized accounts. The '702 Application accomplishes the foregoing by, inter alia, identifying an account type of a first account having a first account name; comparing the first account name to one or more keywords associated with the sub accounts of the account type and where the comparison yields a match; the first account is mapped to a sub account associated with the matching keyword. The '702 Application enables the consolidation, as well as a comparison, of the financial accounting records across various business units, even in instances in which different entities within a multi-entity organization utilize different formats for their financial accounting records.

U.S. patent application Ser. No. 14/043,731 (hereinafter, "the '731 Application") assigned to the assignee hereof describes, inter alia, methods and apparatus for providing data normalization, scalability and maintainability for a plurality of accounting files. In one embodiment, a centralized web application is accessed by an administrative user. A standardized chart of accounts (SCoA) is generated or accessed within the web application. Moreover, when a financial data file from a remote user is received, a chart of accounts (CoA) is generated for the received financial data file. The SCoA and CoA are displayed to the remote user and the generated CoA is normalized to the SCoA by aligning various data fields between the CoA and the SCoA and prompting the remote user to map these unaligned fields. In this manner, the information located within the financial data file is modified to match the SCoA based on the normalized CoA.

Despite the variety of the foregoing methods, improved methods and apparatus are needed for providing, inter alia, customized data analyses, customized report publishing, and customized data forecasting tools that enable, for example, sub-units within a multi-unit organization to gain more meaningful information in relation to how the given sub-unit is performing in relation to its peers. Ideally, such methods and apparatus would provide for automated data manipulation, automated data processing, and/or other automated data identification features.

SUMMARY

The present disclosure satisfies the aforementioned needs by providing, inter alia, improved apparatus and methods for providing customizable data analyses, customizable data reporting, customizable data forecasting, and customizable data calculations.

Additionally, the present disclosure satisfies the aforementioned needs by providing, inter alia, improved apparatus and methods for intelligently generating a desired data and styling structure for the presentation of data inputs that are otherwise arbitrary and/or indeterminate.

In a first aspect, methods for utilizing stored data are disclosed. In one embodiment, the method includes receiving selections for one or more of a financial and/or a non-financial parameter from an entity within the multi-entity organization; filtering the stored data according to the received selections; performing manipulations on the filtered data in order to generate manipulated data; anonymizing the manipulated data; and providing the anonymized manipulated data to the entity within the multi-entity organization.

In one variant, the receiving of the selections for the one or more of the financial and/or non-financial parameter includes receiving a selection based on types of products and/or services offered by the entity within the multi-entity organization.

In another variant, the receiving of the selections for the one or more of the financial and/or non-financial parameter includes selecting a number of service stations available in the entity within the multi-entity organization.

In yet another variant, the receiving of the selections for the one or more of the financial and/or non-financial parameter includes receiving a selection based on a desired performance degree for other units of the multi-entity organization as compared with a performance degree for the entity within the multi-entity organization.

In yet another variant, the method further includes formatting the manipulated data in accordance with a preferred format for the entity within the multi-entity organization.

In another embodiment, the methods include receiving selections for financial and/or non-financial parameters; filtering data according to the selected financial and/or non-financial parameters; performing manipulated or calculations on the financial data; receiving selections to exclude and/or hide portions of the financial data; excluding and/or hiding the selected portions of the financial data; anonymizing the financial data; and causing the display of the financial data for the selected financial and/or non-financial parameters.

In yet another embodiment, the methods include a method of data forecasting for a multi-unit organization. In one implementation, the method includes receiving a selection of a performance degree; identifying sub-units within the selected performance degree; anonymizing and/or performing calculation on financial data from the identified sub-units; generating and causing the display of targeted performance data; receiving financial data and comparing this received financial data to the targeted performance data; and causing the display of the compared financial data.

In yet another embodiment, the methods include a method of account reallocation for a multi-unit organization. In one implementation, the method includes receiving income/expense data; calculating income/expense per sub-unit for the multi-unit organization based on the received income/expense data; and storing the income/expense data in the chart of accounts of a sub-unit for the multi-unit organization.

In yet another embodiment, the methods further include a method of unbalanced financial data identification for a multi-unit organization. In one implementation, the method includes receiving financial data for each sub-unit; identifying unbalanced financial data within the received financial data; performing an algorithmic analysis on the financial data; causing the display of the algorithmic analysis results; and verifying one or more identified errors with the received financial data.

In a second aspect, systems associated with performing data analyses on data from a plurality of entities within, for example, a multi-entity organization are disclosed. In one embodiment, the system includes an analysis server and a database in operative communication with the analysis server. The analysis server is further configured to perform the aforementioned methodologies for performing data analyses on data from a plurality of entities associated with a multi-entity organization.

In a third aspect, apparatuses associated with performing data analyses on data from, for example, a plurality of entities within a multi-entity organization are disclosed. In one embodiment, the apparatus includes an analysis server, the analysis server including: a processing apparatus; and a computer readable apparatus including a storage medium, the storage medium including a plurality of computer-executable instructions, the plurality of computer-executable instructions, when executed by the processing apparatus, are configured to: receive selections for one or more of a financial and/or a non-financial parameter from an entity within a multi-entity organization; filter stored data according to the received selections; perform manipulations or calculations on the filtered data in order to generate manipulated data; anonymize the manipulated data; and provide the anonymized manipulated data to the entity within the multi-entity organization.

In a variant, the plurality of computer-executable instructions, when executed by the processing apparatus, are further configured to: receive a selection of a desired performance degree, the desired performance degree being associated with a performance degree for the entity within the multi-entity organization.

In another variant, the plurality of computer-executable instructions, when executed by the processing apparatus, are further configured to: receive a key performance indicator (KPI) from the multi-entity organization, the received KPI being associated with the received selection of the desired performance degree.

In yet another variant, the plurality of computer-executable instructions, when executed by the processing apparatus, are further configured to: provide a management tool to the entity within the multi-entity organization that enables the entity within the multi-entity organization to determine why the received KPI is, or is not, being met by the entity within the multi-entity organization.

In yet another variant, the stored data is associated with, for example, other entities within the multi-unit organization; and the plurality of computer-executable instructions, when executed by the processing apparatus, are further configured to: compare accounting data associated with the entity within the multi-entity organization with the anonymized manipulated data; and provide the compared accounting data associated with the entity within the multi-entity organization simultaneous with the provision of the anonymized calculated data.

In yet another variant, the plurality of computer-executable instructions, when executed by the processing apparatus, are further configured to: format the manipulated data in accordance with a preferred format for the entity within the multi-entity organization.

In another embodiment, the analysis server is configured to generate a first stylized reporting structure using a default set of data; use the first stylized reporting structure for a secondary set of data, the secondary set of data introducing one or more account values that are not included in the default set of data; and generate a second stylized reporting structure for the secondary set of data.

In a fourth aspect, a computer readable apparatus is disclosed. In one embodiment, the computer readable apparatus includes a storage medium, the storage medium having a plurality of computer-executable instructions, the plurality of computer-executable instructions, when executed by a processing apparatus, are configured to: receive selections for one or more of a financial and/or a non-financial parameter from an entity within a multi-entity organization; filter stored data according to the received selections; perform manipulations or calculations on the filtered data in order to generate manipulated data; anonymize the filtered manipulated data; and provide the anonymized manipulated data to the entity within the multi-entity organization.

In one variant, the received selections for the one or more of the financial and/or non-financial parameter includes a selection based on types of products and/or services offered by the entity within the multi-entity organization.

In another variant, the selections for the one or more of the financial and/or non-financial parameter include a selection of a number of service stations available in the entity within the multi-entity organization.

In yet another variant, the received selections for the one or more of the financial and/or non-financial parameter includes a selection based on a desired performance degree for other units of the multi-entity organization as compared with a performance degree for the entity within the multi-entity organization.

In yet another variant, the plurality of computer-executable instructions, when executed by the processing apparatus, are further configured to: format the manipulated data in accordance with a preferred format for the entity within the multi-entity organization.

In a fifth aspect, a method for generating a stylized reporting structure is disclosed. In one embodiment, the method may be used for data that may be arbitrary or indeterminate, and the method includes: generating a first stylized reporting structure using a first set of data, the first stylized reporting structure including a plurality of cells arranged in rows and columns; using the first stylized reporting structure for a second set of data, the second set of data introducing one or more cell values that are not included in the first set of data; generating a second stylized reporting structure for the second set of data; wherein the second stylized reporting structure and the first stylized reporting structure share a common stylized reporting structure.

In one variant, the generating of the second stylized reporting structure for the second set of data further includes traversing the plurality of cells arranged in the rows and columns in a given order.

In another variant, the method further includes using a plurality of heuristic analyzers that are arranged hierarchically, the plurality of heuristic analyzers performing a hierarchical analysis on a per cell basis in order to determine information associated with respective cells of the second set of data.

In yet another variant, the plurality of heuristic analyzers performing the hierarchical analysis on the per cell basis in order to determine the information associated with the respective cells of the second set of data further includes issuing a plurality of commands, each of the plurality of commands further including a respective confidence level.

In yet another variant, the method further includes determining which ones of the plurality of commands possesses a highest confidence level and selectively executing a portion of the plurality of commands that possesses the highest confidence level.

In yet another variant, the method further includes determining a command type for each of the plurality of commands and selectively executing the portion of the plurality of commands that possesses the highest confidence level of a given command type.

In a sixth aspect, a heuristics analyzer is disclosed. In one embodiment, the heuristics analyzer is configured to receive a stylized reporting structure; receive one or more sets of data; analyze the combinations of structure for the one or more sets of data; analyze the stylized reporting structure; and generate one or more possible resolutions for the generation of a derived report in accordance with the stylized reporting structure.

In a seventh aspect, methods of using the analysis server are disclosed. In one embodiment, the method includes using the aforementioned heuristics analyzer in order to combine disparate reporting structures such as multiple charts of accounts and/or multiple datasets including multiple periods, multiple locations and/or derived calculations into a single final report.

In an eighth aspect, methods of using the aforementioned heuristics analyzer are disclosed.

In a ninth aspect, business methods associated with the use of the aforementioned analysis server are disclosed.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 9 is a screenshot of a first exemplary original reporting structure for an account with a stylized format in accordance with the principles of the present disclosure.

FIG. 10 is a screenshot of an updated reporting structure for the account of FIG. 9 illustrating the deviation of the stylized format in accordance with the principles of the present disclosure.

FIG. 11 is a screenshot of the updated reporting structure for the account of FIG. illustrating the carryover of the stylized format of FIG. 9 in accordance with the principles of the present disclosure.

FIG. 12 is a screenshot of a second exemplary original reporting structure for an account with a stylized format in accordance with the principles of the present disclosure.

FIG. 13 is a screenshot of an updated reporting structure for the account of FIG. 12 illustrating the deviation of the stylized format in accordance with the principles of the present disclosure.

FIG. 14 is a screenshot of the updated reporting structure for the account of FIG. 13 illustrating the carryover of the stylized format of FIG. 12 in accordance with the principles of the present disclosure.

Figure 1:
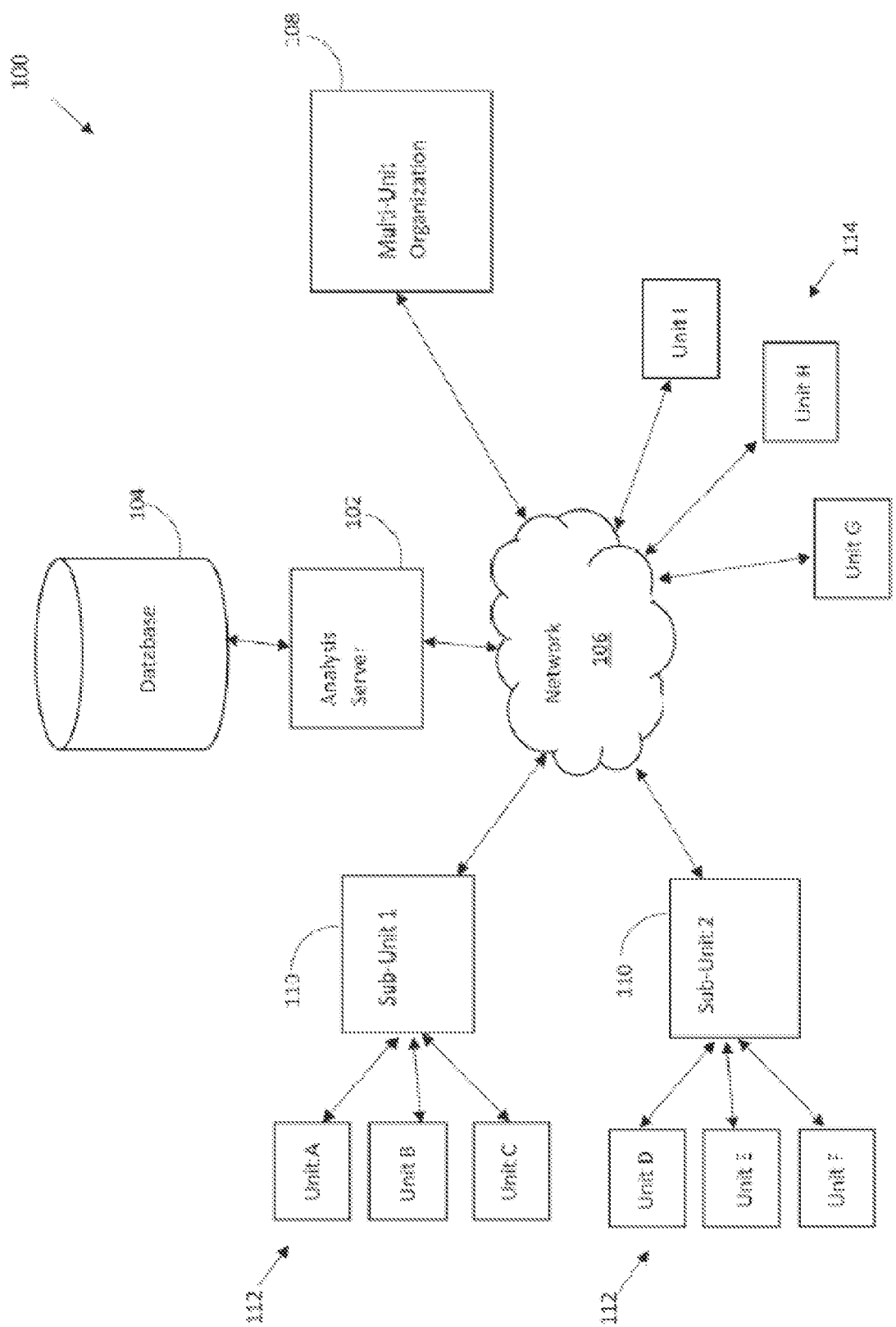
FIG. 1 is a block diagram of one embodiment of a system for multi-unit organization data collection and analysis in accordance with the principles of the present disclosure.

All Figures© Copyright 2016-2017 Qvinci Software, LLC. All rights reserved.

DETAILED DESCRIPTION

Reference is now made to the drawings, wherein like numbers refer to like parts throughout.

As used herein, the terms "computer", and "computing device" refer broadly to any type of digital computing or processing device(s) including, without limitation, microcomputers, minicomputers, laptops, hand-held computers, smartphones, tablets, personal digital assistants (PDAs), cellular or satellite-based telephones and any other device or collection of devices capable of running a computer program thereon and/or any other device capable of interchanging data with a network.

As used herein, the terms "computer program" and "application" refer to any algorithm, sequence of machine-related instructions (regardless of whether rendered or embodied in source or object code), or a unit of executable software adapted to perform one or more particular tasks. Such computer programs or applications can include any number of differing architectures including but not limited to, for example, stand-alone applications, distributed applications and object request broker architectures, or other networked applications, and may be stored in any device or any other structured or unstructured digital format including, without limitation, embedded storage, random access memory, hard disk, read-only memory, static memory, optical disc, compact discs (CDs), digital video discs (DVDs), smart card, or magnetic bubble memory. Further, such computer programs and applications may be rendered in virtually any programming language or environment including, for example, C #, JavaScript, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), .NET, and the like.

As used herein, the terms "Internet" and "internet" are used interchangeably to refer to inter-networks including, without limitation, the Internet.

As used herein, the term "network" refers generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet.TM.), radio frequency tuner (e.g., in-band or OOB, cable modem, etc.), Wi-Fi (802.11a,b,g,n), WiMAX (802.16), PAN (802.15), or IrDA families.

As used herein, the term "processor" refers to all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or digital media capable of storing content or other information (e.g., "cloud" storage).

Overview

The present disclosure provides for, inter alia, methods and apparatus for analyzing and performing calculations for data stored in, for example, charts of accounts (CoAs) across a plurality of business units or other entities. In exemplary embodiments described herein, one or more centralized analysis server(s) are utilized to enable a user to utilize customized properties, such as non-financial properties or customized date periods, in order to sort through financial data so as to provide both multi-unit organizations (e.g., a franchisor) as well as various sub-units of the multi-unit organization (e.g., a franchisee) meaningful metrics for determining the health of a given business or organizational unit or given businesses or organizational units.

In addition, exemplary embodiments described herein enable, for example, a designated administrator to create a customized report and deploy it across various sub-units of a multi-unit organization. For example, an administrator of a multi-unit organization can create a list of so-called key performance indicators (KPIs) that they want all sub-units within the multi-unit organization to monitor in order to facilitate the overall financial success of all sub-units within the multi-unit organization.

In another aspect, exemplary embodiments described herein enable an administrator of, for example, a multi-unit organization to reallocate various income and/or expenses across various ones of the sub-unit organizations. For example, a given multi-unit organization may incur various expenses that are more efficient for the multi-unit organization to incur due to, inter alia, economies of scale. Various apparatus and methodologies described herein subsequently enable the multi-unit organization to reallocate these incurred expenses across various ones of the sub-units based upon parameters associated with each of these sub-units.

In yet another aspect, exemplary embodiments described herein provide for the ability for an administrator of, for example, a multi-unit organization to exclude various financial accounting data for individual ones of the sub-units for the purpose of peer benchmarking. For example, where a given franchisee's net income is below an established minimum, this given franchisee may be excluded from comparison as it has been determined that this given franchisee is not part of a valid peer ecosystem for one or more other franchisees.

In yet another aspect, exemplary embodiments described herein enable one or more sub-units of a multi-unit organization the ability to "drill down" into their respective financial data. For example, when a given franchisee is unable to meet a designated key performance indicator (KPI), the franchisee will be able to view financial data associated with that KPI in order to determine the reasoning behind why it has been unable to meet the designated KPI.

In yet another aspect, exemplary embodiments described herein enable a sub-unit of a multi-unit organization to prevent the display of a given financial metric to other sub-units or even to the multi-unit organization itself. For example, a given franchisee may not desire to give management a view into their balance sheet data. Such a feature enables higher adoption rates for end users as a result of providing the end users' exclusive control over their ability to share chosen financial data with their franchisors.

In yet another aspect, exemplary embodiments described herein enable a user to quickly determine potential incorrect or missing data from their sub-unit and/or multi-unit organization's financial data. This functionality enables a user to quickly determine instances in which their books may be "out of whack", prior to sending out their financial data to, for example, a third-party accountant.

In yet another aspect, exemplary embodiments described herein enable various sub-unit organizations to quickly and efficiently forecast their finances for their businesses going forward. For example, such a tool enables sub-units within a multi-unit organization to quickly identify areas of perceived financial weakness in order to enable the sub-unit to quickly address and correct these perceived financial weaknesses.

In yet another aspect, improved apparatus and methods for intelligently generating a desired data and styling structure for the presentation of data inputs that are otherwise arbitrary and/or indeterminate are also disclosed.

Accordingly, the present disclosure enables for the abstraction and/or presentation of financial data in order to, inter alia, provide meaningful information for improving upon the operation and functionality of various sub-units within a given multi-unit organization.

Detailed Description of Exemplary Embodiments

Exemplary embodiments of methods and apparatus according to the present disclosure are now described in detail. Moreover, while aspects of the present disclosure are intended to build upon the systems, tools and methodologies described within co-owned U.S. patent application Ser. No. 14/697,467 filed Apr. 27, 2015 entitled "Methods and Apparatus for the Aggregation of Data", which is a continuation of and claims priority to U.S. patent application Ser. No. 12/834,791 filed Jul. 12, 2010 entitled "System and Method for Compilation of QuickBooks Accounts Data", now U.S. Pat. No. 9,020,946; co-owned U.S. patent application Ser. No. 12/944,702 filed Nov. 11, 2010 entitled "System and Method for Consolidating Account Data"; and co-owned U.S. patent application Ser. No. 14/043,731 filed Oct. 1, 2013 entitled "Methods and Apparatus for Providing Data Normalization, Scalability and Maintainability", which claims the benefit of priority to U.S. Provisional Patent Application 61/709,495 filed Oct. 4, 2012 entitled "Charts of Accounts Normalization, Scalability and Maintainability", each of the foregoing incorporated herein by reference in its entirety, the scope of the present disclosure is not so limited. In fact, various aspects of the disclosure contained herein could be readily adopted in differing financial accounting platforms.

Moreover, while aspects are disclosed in the context of associated multi-unit organizations (e.g., franchisee/franchisor organizations, multi-unit non-profit organizations, etc.), it is appreciated that many of the aspects described herein can be utilized in other non-multi-unit organizations. For example, many of the principles described herein may be equally applied to non-associated organizations (e.g., competitors operating within the same market) for the purposes of, for example, peer and/or industry benchmarking. Moreover, many of the principles described herein may be applied to a collective of units that are otherwise not related to one another. For example, many of the principles described herein may be implemented by a given accountant, or a given accounting firm, for the purpose of, for example, peer and/or industry benchmarking or the utilization of a standard chart of accounts across all clients within the same industry vertical. These and other variations would be readily apparent to one of ordinary skill given the contents of the present disclosure.

Additionally, while aspects are disclosed in the context of displaying commonly stylized reports of, for example, accounting data associated with multi-unit organizations (e.g., franchisee/franchisor organizations, multi-unit non-profit organizations, etc.), it is appreciated that many of the aspects described herein may be utilized in other non-multi-unit organizations and/or may be utilized in non-accounting data report generation. For example, many of the principles described herein may be equally applied to non-associated organizations (e.g., across multiple clients for a given accountant) for the purposes of, for example, providing a uniform stylized method of formatting this data. Additionally, the data contained within these generated reports may consist of non-accounting style data such as, for example, inventory data associated with commercial or residential real estate, as but one example, or for point-of-sale data associated with retail sales systems, as another example. These and other variations would be readily apparent to one of ordinary skill given the contents of the present disclosure.

Finally, while aspects are disclosed in the context of the intelligent styling of generated reports in the context of spreadsheet application software (in particular in the formatting and styling of the rows and/or columns of a spreadsheet application such as the Microsoft Excel® using, for example, arbitrary and/or indeterminate data), it is appreciated that the methodologies and apparatus described herein are not so limited. For example, many of the principles described herein will find utility in other forms of data structures such as, without limitation, data structures constructed with the Extensible Markup Language (XML), JavaScript Object Notation (JSON), YAML, and the like.

Exemplary Multi-Unit Organization Data Collection and Analyses System

The concept of multi-unit organizations is not new. For example, the use of franchising business models allows a franchisor to secure its intellectual property rights, control the business concept and secure business know-how, while minimizing its risks by shifting many of the costs of operating individual business units to its franchisees. While many of these risks have been shifted away from the franchisor, it is within the economic interest of the franchisor to ensure the success of its individual franchisees through, for example, the provision of training and advisory services. With the advent of modern computer networks, the ability for individual units within a multi-unit organization to rapidly share information with other members of the multi-unit organization has provided an opportunity to add additional tools to enable the overall success of these multi-unit organizations. Accordingly, various tools and methodologies are described herein which have been specifically enabled to, inter alia, facilitate the success of multi-unit organizations in a modern computer networked world.

Moreover, and as discussed supra, while FIG. 1 is primarily discussed in the context of related or loosely-related multi-unit organizations, it would be readily apparent to one of ordinary skill given the contents of the present disclosure that the discussion of, for example, FIG. 1 may be readily applied to a plurality of non-related organizations or entities. For example, many of the principles described herein may be applied to similar organizations (e.g., a collection of dentists that are otherwise not related to one another financially, but that are being serviced by a given accountant or a given accounting firm); related but dissimilar organizations (e.g., a conglomerate with multiple differing subsidiaries with individual ones of subsidiaries offering substantially different products and/or services from other ones of the subsidiaries); or unrelated non-profit organizations (e.g., the operation of a cancer non-profit organization may be compared against the operation of a non-profit organization that services the homeless, as but one non-limiting example). These and other variants would be readily apparent to one of ordinary skill given the contents of the present disclosure.

FIG. 1 illustrates one exemplary embodiment of a system 100 for performing data manipulations (e.g., calculations, logical comparisons, formatting, etc.), analyses and/or other operations on, for example, non-financial or financial data stored in data structures (e.g., CoAs, SCoAs, etc.) for, for example, various sub-units within a multi-unit organization. These data manipulations may include, for example, calculations such as, without limitation, addition, subtraction, multiplication, division; logical comparisons such as, without limitation, the utilization of logical operations such as the use of NOT, AND, OR, NAND, NOR, XOR, XNOR operations; various formatting operations such as, without limitation, transpositions, bolding, highlighting, markings; or combinations of the foregoing, as depicted in FIG. 1, the system includes an analysis server 102 in data communication with a database 104 through, for example, a network interface. The analysis server 102 may be in data communication with a network 106, such as the Internet, which enables communications between the analysis server 102 and various user computing devices associated with, for example, a multi-unit organization. Additionally, it is readily appreciated that various ones of the user computing devices may be locally connected to the analysis server 102 in addition to, or alternatively from, being in data communication with the analysis server 102 via a network 106. Moreover, although the database 104 is illustrated as being in data communication with the analysis server 102 locally, it is readily appreciated that the database may be accessed via the network 106 in some implementations. In so-called distributed database implementations, multiple databases may be placed in data communication with the analysis server 102 locally and/or via a network 106.

The aforementioned user computing devices may include, in the illustrated non-limiting embodiment, a multi-unit organization centralized computing device 108, computing devices associated with, for example, sub-units 110 that are in turn in data communication with associated individual unit computing devices 112, and non-sub-unit associated individual unit computing devices 114. While a specific topology is illustrated, it is readily appreciated that various aspects of the illustrated topology could be readily modified. For example, additional computing servers (not shown) may be implemented between various ones of the computing devices 108, 110, 112, 114. In another example, various one of the computing devices and/or the analysis server 102 may be in data communication with external databases (not shown) via the network 106. In even another example, more than one multi-unit organization computing device (and computing devices associated with sub-units of the various multi-unit organizations) may be in data communication with the network 106 and the analysis server 102. These and other variants would be readily appreciated by one of ordinary skill given the contents of the present disclosure.

Exemplary Multi-Unit Organization Data Collection and Analyses Apparatus

Figure 2:
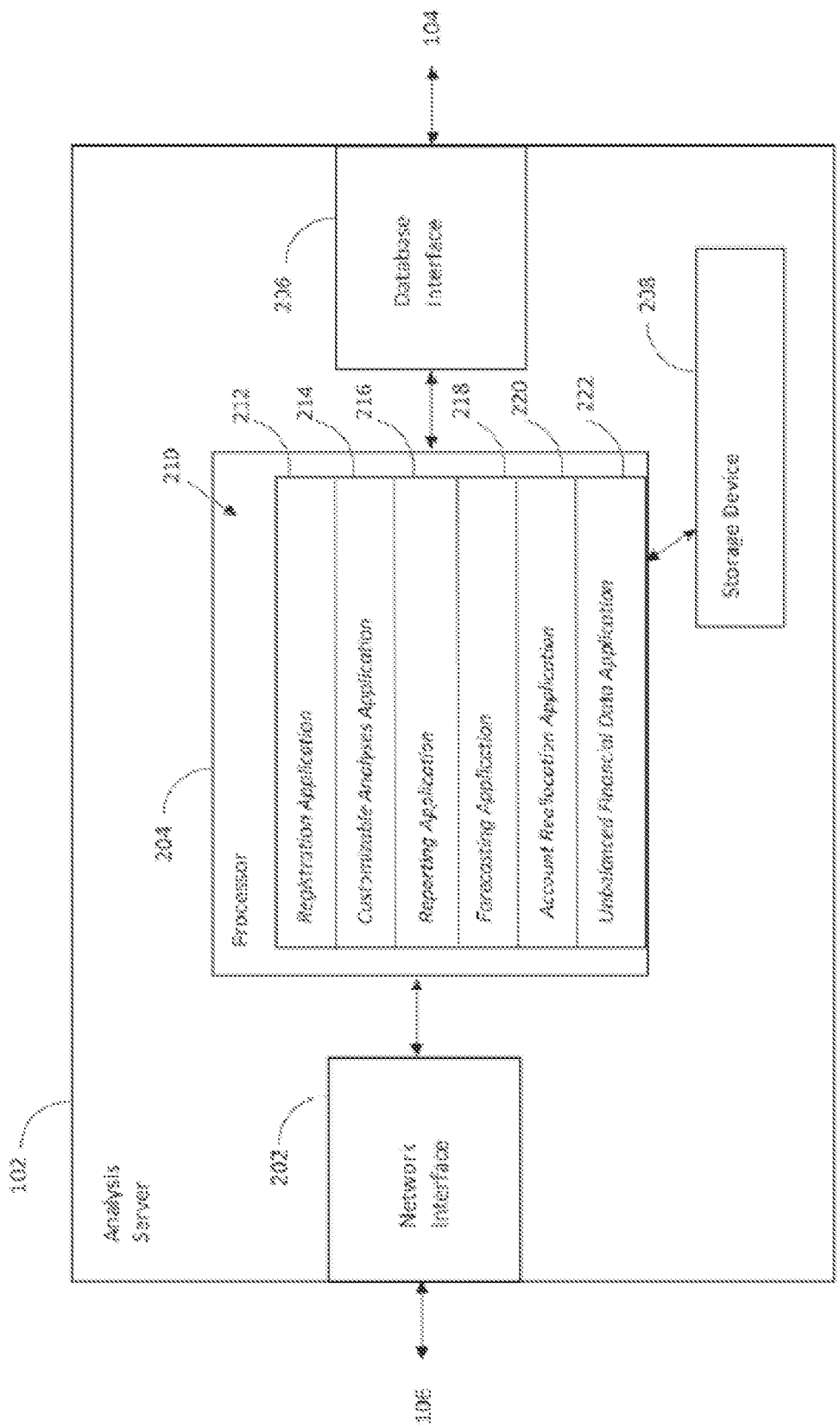
FIG. 2 is a block diagram of one embodiment of an analysis server apparatus for data collection and analysis in accordance with the principles of the present disclosure.

The block diagram shown in FIG. 2 depicts one exemplary implementation of an analysis server 102 for use in performing data manipulations, analyses and/or other operations on data stored in, for example, normalized CoAs for, for example, various sub-units associated with or within a multi-unit organization. As depicted, the analysis server 102 generally may include a network interface 202, a processor 204, a database network interface 206, and a storage device 208. The network interface 202 enables communication with, for example, the network 106 illustrated in FIG. 1, while the database network interface 206 enables communication with, for example, a local discrete database 104 as illustrated in FIG. 1. In some implementations, one or both of these network interfaces 202, 206 may be obviated and/or their functionality may be combined into a single network interface (e.g., network interface 202).

In some implementations, the database 104 may be an internal component of the analysis server 102 (such as consisting of storage device 208). The processor 204 is configured to execute one or more applications 210 thereon to carry out the various functions of the analysis server 102. In the illustrated embodiment, the various applications 210 may include one or more of a registration application 212, a customizable analyses application 214, a reporting application 216, a forecasting application 218, an account reallocation application 220, and an unbalanced financial data application 222. The aforementioned applications may be stored on the storage device 208, the database 104 or combinations of the foregoing. Moreover, while discussed in the context of discrete applications that serve their intended function, it is appreciated that each of the foregoing applications may be combined with one another, or alternatively, further redistributed into more compartmentalized discrete applications. The foregoing illustrated implementation merely being indicative of various capabilities and functions that may be associated with the analysis server 102 as described herein.

The registration application 212 enables collection of user information (e.g., sub-unit and/or multi-unit organization information), such as for example, a user's location, business name, multi-unit organization association information, and/or other unit characteristic (e.g., non-financial) information (e.g., number of employees, average number of customers, number of service stations, square footage of location, etc.) in order to create user profile(s) along with a stored user identity associated with the user (e.g., a unique encoded identity). Based on the received user information, the registration application 212 may generate a user profile (e.g., a sub-unit or individual unit user profile, a multi-unit organization profile, etc.) for display on a graphical user interface (GUI) of a display of, for example, a user computing device. Moreover, data tables, other records, and/or various user selections may be received, normalized, mapped, modified, stored, anonymized and/or associated with a user profile via the registration application 212. One exemplary generalized methodology for utilizing the registration application 212 is shown and discussed with reference to FIG. 4. Moreover, it will be appreciated that other embodiments for user registration and normalization of CoAs according to a SCoA are disclosed in related U.S. patent application Ser. No. 14/043,731 filed Oct. 1, 2013 and entitled "Methods and Apparatus for Providing Data Normalization, Scalability and Maintainability", the contents of which were previously incorporated herein by reference in its entirety.

The customizable analyses application 214 enables selection of parameters (e.g., various financial and/or non-financial parameters, etc.) for the filtering of data stored in, for example, various CoAs associated with sub-unit(s) and multi-unit organizations. For example, selections may be received from a user for comparisons of financial data across, for example, sub-units having similar characteristics (e.g., sub-units of similar size, sub-units with a similar number of employees, sub-units of a specified regional location, etc.). Moreover, the customizable analyses application 214 may enable selection of parameters for comparison with otherwise dissimilar entities. The customizable analyses application 214 may further enable anonymization of selected data, exclusion of selected data, automated updates as new data is received, and/or linking to detailed data associated with, for example, specific sub-unit(s). Moreover, the selections, calculations, and analyses received or performed by the customizable analyses application 214 may additionally be passed to, or used in combination with, other applications (e.g., the reporting application 216, the forecasting application 218, etc.). One exemplary generalized methodology for the customizable analyses application 214 is shown and described subsequently herein with reference to FIG. 5.

The reporting application 216 enables generation and transmission (e.g., publishing) of customizable reports of data (e.g., the publishing of data selected, manipulated, and/or analyzed via the customizable analyses application 214) for, for example, one or more sub-units and/or the overall multi-unit organization. For example, a multi-unit organization may create a desired report including selected KPIs and transmit the report to associated sub-units. Accordingly, the sub-units may monitor these selected KPIs which facilitate the monitoring of the overall health of the respective sub-unit. In another example, sub-units may create local reports for internal documentation or transmission to the multi-unit organization. As but another example, otherwise unrelated entities may be able to generate customizable anonymized reports for sharing reporting data amongst one or more other non-related entities. One exemplary generalized methodology for the reporting application 216 is shown and discussed with reference to FIG. 5 (specifically a portion thereof) described subsequently herein.

The forecasting application 218 enables generation of targeted performance data as well as generation of a comparison of data received from, for example, various one of the sub-units to the generated targeted performance data. For example, in order to track monthly goals, a user associated with a sub-unit may select a performance degree (e.g., top 5% of performing sub-units within the multi-unit organization). Subsequently, averaged data (e.g., anonymized and/or non-anonymized data) for the sub-units within the selected performance degree is then provided as target performance data, and received data from the sub-unit from which a request for forecasting originated is then compared to the target performance data for a selected period of time (e.g., one month, one fiscal quarter, one fiscal year, etc.). Moreover, the forecasting application has utility beyond just multi-unit organizations. For example, the forecasting application may have utility for, for example, competitors within a given geographic location as but one non-limiting example. Additionally, the forecasting application 218 enables dynamic display of selected forecast and forecast comparison data, automatic updates as new data is received, and/or transmission of notification(s) to one or more user devices. One exemplary generalized methodology for the forecasting application 218 is shown and discussed with reference to FIG. 6 described subsequently herein.

The account reallocation application 220 enables reallocation of income and/or expense data incurred by the multi-unit organization to, for example, the CoAs of one or more sub-units. In one example, expense data is allocated by the multi-unit organization by dividing up the number of sub-units equally (e.g., by reallocating to sub-units that receive a product and/or benefit associated with the expense data on a per sub-unit basis). In another example, expense data may be reallocated to sub-unit(s) and optionally the multi-unit organization itself according to characteristics associated with these entities (e.g., reallocation on a per square footage basis, reallocation based upon an average number of customers for the sub-unit, reallocation based on the number of employees for the sub-unit, and/or other operating characteristics associated with the sub-unit). One exemplary generalized methodology for the account reallocation application 220 is shown and discussed with reference to FIG. 7.

The unbalanced financial data application 222 enables identification of unbalanced data within, for example, one or more CoAs or SCoAs. In one example, data is analyzed for unbalanced totals within the CoA (e.g., assets unequal to liabilities and equity) and out of balance data is rapidly identified and reported to, for example, a user computing device. Accordingly, the unbalanced financial data application 222 enables quick and automated identification of possible errors. Moreover, the unbalanced financial data application 222 enables identification of these errors early in, for example, the accounting process thereby mitigating the possibility that these errors may remain unchecked for a number of days/months. Additionally, in some examples, common error types may be identified (e.g., misplaced decimal point errors, transposed digits errors, etc.) and data may be corrected with, for example, user verification of the identified data. One exemplary generalized methodology for the operation of the unbalanced financial data application 222 is shown and discussed with reference to FIG. 8.

Figure 3:
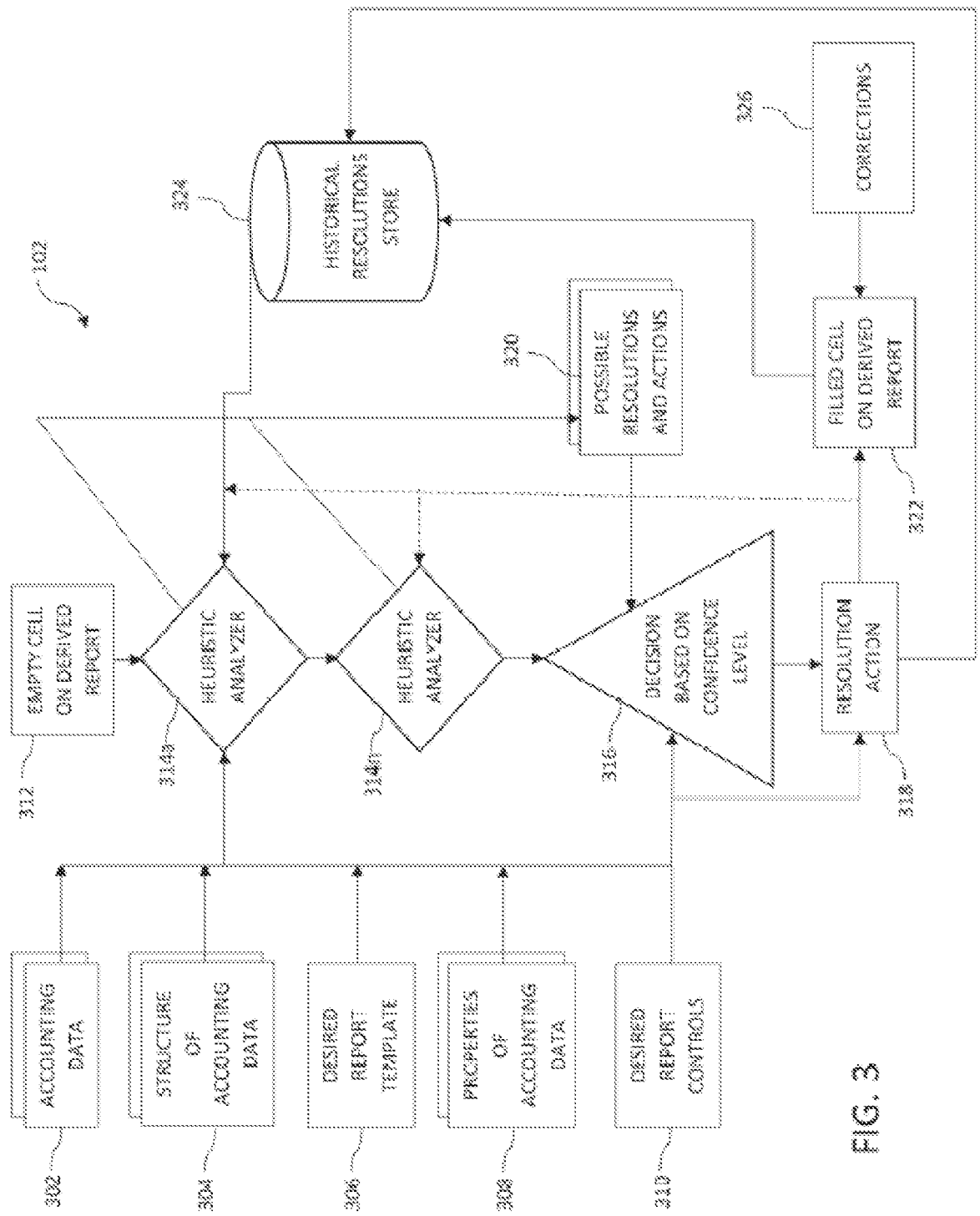
FIG. 3 is a block diagram of another embodiment of an analysis server apparatus for the derivation of derived reports from indeterminate or determinate input data in accordance with the principles of the present disclosure.

Referring now to FIG. 3, an exemplary logical flow diagram for the heuristics translation of data (including, but not limited to, accounting data) into a predesignated styling format is shown and described in detail. More particularly, FIG. 3 illustrates a variant (or portion) of the analysis server 102 which may be utilized separately or in conjunction with the various applications described with respect to the analysis server 102 as discussed with reference to FIG. 2. Additionally, while primarily discussed in the context of translating data into a predesignated styling format, the exemplary logical flow diagram of FIG. 3 is not limited to such usage scenarios. For example, the exemplary logical flow diagram of FIG. 3 may further be utilized for other common usage scenarios including data integrity verification, error detection, fraud detection, and provision of notification messages (via email, text message, etc.).

FIG. 3 illustrates the overall logical flow of elements (or software modules) as they are envisioned as being utilized together in accordance with some implementations of the present disclosure. As a brief aside, in the context of an exemplary spreadsheet software application (e.g., Microsoft Excel®) in which data is represented in a reporting structure having both rows and columns, each cell within the reporting structure will be referred to hereafter as a data element. When generating, for example, a desired formatting style for a given reporting structure, this formatting style is easily reproducible when the inputs for these data elements are maintained in a consistent (i.e., one-to-one) relationship. However, when data elements are added or removed and/or when existing data elements are displaced (i.e., shifted up or down within a column and/or shifted left or right within a row), the desired formatting style becomes out of sync. Accordingly, maintaining the synchronization of the desired formatting style is the desired output using the logical flow architecture depicted in the analysis server 102 as illustrated in FIG. 3 in accordance with some implementations.

FIG. 3 illustrates an empty cell 312 (data element) on a report that is to be derived, while various inputs are sent to the one or more heuristic analyzers 314a . . . 314n. These various inputs include, one or more of various accounting data 302; various structural information 304 (e.g., parent-child relationships) for this various accounting data; a desired report template 306 indicating the desired formatting style and data content for the template; various properties 308 of the accounting data itself; as well as any report control parameters 310 that may be provided. Moreover, and as discussed previously herein, the principles described with respect to FIG. 3 aren't necessarily limited to financial accounting data, although the use of the exemplary financial accounting data example may be useful in helping to clearly understand the principles of the present disclosure.

Moreover, these various inputs may be arbitrary and/or indeterminate at the time that a derived report is to be generated; however, the arbitrary and/or indeterminate nature of these inputs isn't necessary for the practice of the principles described with respect to FIG. 3. The various accounting data 302 may include, for example, account values for a data element, an account name for one or more data elements, date periods for the account values, and/or other associated accounting data. The various structural information 304 present may include, for example, multiple levels of dependency including, but not limited to, a parent, a child of the parent, and a child of the child of the parent. Various structural information between various items of accounting data are described in co-owned U.S. patent application Ser. No. 14/697,467 filed Apr. 27, 2015 entitled "Methods and Apparatus for the Aggregation of Data", which is a continuation of and claims priority to U.S. patent application Ser. No. 12/834,791 filed Jul. 12, 2010 entitled "System and Method for Compilation of QuickBooks Accounts Data", now U.S. Pat. No. 9,020,946; U.S. patent application Ser. No. 12/944,702 filed Nov. 11, 2010 entitled "System and Method for Consolidating Account Data"; and U.S. patent application Ser. No. 14/043,731 filed Oct. 1, 2013 entitled "Methods and Apparatus for Providing Data Normalization, Scalability and Maintainability", which claims the benefit of priority to U.S. Provisional Patent Application 61/709,495 filed Oct. 4, 2012 entitled "Charts of Accounts Normalization, Scalability and Maintainability", each of the foregoing previously incorporated herein by reference in its entirety. The desired report template 306 may indicate the desired formatting style for the template and may include, for example, the desired style (e.g., font-type, font-size, font color), the desired formatting (e.g., bolding, italicizing, highlighting), as well as the various manipulations to be generated as well as the various formulas for these manipulations in the derived report.

The desired report template 306 may also include parameterized instructions within respective cells, thereby giving the analyzers filters on, for example, accounts, periods, locations, and other non-financial and financial accounting data, for inclusion in the derived report as well as where to put the accounting data in the report. For example, instructions may be included in columns of the report for including the formatting and styling of relative period over period accounting data within the derived report. The desired report template may also contain references to the desired report controls which provide the analyzers with instructions and/or filters by which accounts, periods, date ranges, locations, and other accounting data are included in the derived report as well as where to place accounting data in the derived report. Instructions may guide the analyzers to include period over period accounting data columns for one or more date ranges. As but another example, instructions may guide the analyzers to exclude certain types of accounting data rows from the derived report. Additionally, various desired report controls may be provided such as, for example, lookup word replacements to customize text in the derived reports, images/graphics/artwork to include in the derived report, headers, and/or footers to include in the derived report, etc. Additionally, other properties 308 may be included such as, for example, non-structural information and/or other meta-data about the arbitrary accounting data. For example, these other properties 308 may include information used to further refine the mapping of the various data elements and the processing of the accounting data in the derived report.

One or more heuristic analyzers 314a . . . 314n are depicted which are configured in a multitude of ways such that they may work alone, work together, work in tandem with another one or more of the heuristic analyzer(s), or work together over a network via one or more network interfaces. In some implementations, the heuristic analyzers 314a . . . 314n are arranged hierarchically. In other words, the heuristic analyzers 314a . . . 314n are configured to run recursively such that, for example, a level one analyzer may first be run, followed by a level two analyzer which takes as input the results (output) of the level one analyzer and so on and so forth. In one or more implementations, these heuristic analyzers 314a . . . 314n are configured to compute one or more possible resolutions and/or actions 320 for the mapping of the various inputs 302, 304, 306, 308, 310 into, for example, a derived report by, for example, examining the combinations of structure, template, controls and/or other properties associated with these inputs. For example, one such heuristic analyzer 314a may look at the parent-child relationships of the accounts to derive a resolution that a new account in the arbitrary accounting data belongs to category (e.g., "Cost of Goods") within the derived report even when that new account has previously never been encountered. As yet another example, when multiple resolutions are calculated, a weighting, probability, or ranking is assigned to each resolution based upon prior experience(s) that might be either coded directly into the heuristic analyzer, or that may be calculated from a historical record of previous selection experience from previously generated reports within the historical resolutions store 324. Such prior experience(s) may be selected either manually (by a user), and/or may be automatically provided from information contained within the historical resolutions data store 324.

In some implementations, one or more of the heuristic analyzers 314a . . . 314n are configured to run on each data element and are further configured to answer simple yes or no questions of the data contained within the data element. For example, a heuristic analyzer may answer whether or not a given data element is empty. If the data element is not empty, the heuristic analyzer may answer whether not the data element contains text, whether or not the data element contains a formula, and/or whether or not the cell contains a numerical value. In instances in which the data element is found to contain text, one or more of the heuristic analyzers may determine whether or not the data element is representative of an account, and if so, a command may be generated for execution by the resolutions and/or actions module 320. In some implementations, this command may be generated based on a determined confidence level of the answer based on information generated by the one or more heuristic analyzers. For example, if the determined confidence level is below a predetermined threshold value, the command may not be utilized for execution by the resolution action module 318. If, however, the determined confidence level is above the predetermined threshold value, the command may be utilized for execution by the resolution action module 318. In some implementations, the predetermined threshold value may be determined by the desired report controls module 310. In some variants, the generated command may be compared with other similar and/or conflicting commands, with the command to be executed possessing the highest confidence level.

The possible resolutions and/or actions module 320 can be utilized in order to create a derived report based on, for example, the arbitrary and/or indeterminate inputs (or determinate inputs). These possible resolutions and/or actions 320 may be based upon outputs from the one or more heuristic analyzers 314a . . . 314n and/or from information contained within the historical resolutions data store 324. In addition to creating derived reports, the possible resolutions and/or actions module 320 may also be used, in combination with the aforementioned heuristic analyzers 314a . . . 314n, in order to perform data integrity verification, error detection, fraud detection, and provision of notifications. For example, and in the context of data integrity verification and error detection, the heuristics analyzers may detect, for example, data integrity issues such as, for example, data elements that fail to reconcile with one another (e.g., where data elements fail to sum up to the same value). Error (or fraud) detection may occur when analyzing data elements that are expected to have a zero (or non-zero) value; expected to have a positive or negative value; expected to have values within a certain range of values; expected to have a value that is greater than, less than, or equal to the data value of other data element(s); are expected to have a given position with respect to other data elements (e.g., above, below, left, or right of other elements), etc.

A decision based on confidence level module 316 is a logical decision block which selects one or more resolution actions from the set of possible resolutions and/or actions. For example, the logical decision block may take into consideration the weighting values, probability values, and/or ranking values in order to select a resolution from the set of possible resolutions and/or actions. The resolution selected by the logical decision block is applied to the derived report at the resolution action module 318. For example, a selected action may include adding a new row and/or a new column to accommodate the new presented account under a "Cost of Goods" heading. As another example, a selected action may remove a row and/or column to accommodate accounting data that is absent from the derived report. The resolution action module 318 may use some or all of the input elements (e.g., accounting data, structure, properties, controls and/or template(s)) to either determine what data element needs to be placed in the output cell on the derived report; or recursively rerun one or more heuristic analyzers 314a . . . 314n for a more accurate resolution calculation. Additionally, the selected resolution (action) as well as results may also be saved an in-memory cache for recursively rerunning and improving the derived report, and/or in a historical resolutions store 324. Accordingly, by saving the selected resolution in the historical resolutions store 324 or otherwise having the selected resolution cached in process memory, the selected resolution may be utilized as a reference point for further refinement of future derived reports. The filled cell on derived report module 322 illustrates a decision point in which the cell is filled with the data element on the final derived report. The corrections module 326 may be utilized in order to allow a user to make corrections and/or changes to the filled cell on the derived report module 322. Additionally, these corrections and/or changes may be archived in the historical resolutions store 324 so that, for example, the heuristic analyzers 314a . . . 314n may adjust, for example, their internal weightings based on the historical preferences of a given user. In other words, the corrections module 326 enables the analyzers 314a . . . 314n to "learn" from their mistakes so as to further optimize the operation of the analyzers for, for example, a given user or entity.

For purposes of, for example, the aforementioned data integrity verification, error detection and/or fraud detection, the resolution and actions store 320 may be used to apply formatting and/or styling to the derived report in order to, for example, "mark" data elements with integrity, error, and/or detected fraud issues. For example, a particular styling (e.g., shading in the data element with a given color, addition of flagged comments, etc.) may be added to data elements for which a data integrity, error, and/or fraud issue may be present as detected by the heuristics analyzers 314a . . . 314n. In such a scenario, the resolution action module 318 may transmit a notification (e.g., an email or text message) of this detected data element for which a data integrity, error, and/or fraud issue may be present. As but another example, additional rows or columns may be added to the derived report in which the discrepancy (or type of discrepancy) may be annotated for further analysis by, for example, an accountant. In some scenarios, the determined discrepancy may be automatically detected and fixed and the additional rows or columns may be added to highlight the automatic correction of the detected issues. As but yet another example, entire new sections may be added to the derived report that provides for a detailed description of the problem(s) that were detected. As but yet another example, the resolutions actions module 318 may attempt to take corrective steps at the original data source by providing notifications to the source of the data (e.g., data values within data elements, the structure of the data, etc.) in order to resolve detected deficiencies prior to incorporating this data into the derived report. These and other variants would be readily apparent to one of ordinary skill given the contents of the present disclosure.

In addition to the foregoing, the resolution action module 318 may further apply formatting and styling based on different rules associated with their respective weightings and/or rankings. For example, perceived minor errors may mark the data elements with these minor errors without issuing a notification; however perceived major errors may, in addition to or alternatively than the aforementioned marking of the data elements, result in the transmission of a notification in order to seek, for example, immediate attention for the detected error. Minor errors may include, for example, data values within a given data element in which the given data value doesn't match with a respective data value for which a match would be expected within a predetermined degree (e.g., within tens of dollars as but one example). Major errors may include, for example, data values within a given data element for which a match would be expected that are mismatched by, for example, orders of magnitude of difference which may be indicative of, for example, transposed decimal places, fraudulent activity, etc. Additionally, the historical resolutions action store 324 may contain past examples of similar errors that may have occurred in the past and for which a currently detected issue shares common characteristics. For example, an error that was previously determined to be fraud may be used for future detections of fraud based on similarities between the analysis from, for example, the heuristics analyzers 314a . . . 314n.

Each of the elements referred to in FIG. 3 may be embodied on one or more computing devices (e.g., in an analysis server 102) and in one or more software (or hardware) applications running on these devices. Additionally, various ones of the elements depicted in FIG. 3 may be grouped together onto a single device (e.g., the heuristic analyzer(s) 314a . . . 314n and the historical resolutions storage device 324); or alternatively, various ones of these elements may be distributed across multiple computing devices (e.g., the heuristic analyzer(s) 314a . . . 314n may be distributed across multiple servers). For example, the various inputs depicted in FIG. 3, including the one or more of various accounting data 302; various structural information 304 (e.g., parent-child relationships) for this various accounting data; a desired report template 306 indicating the desired formatting style for the template; as well as various properties of the accounting data 308 itself may be received from an individual's computing device via a network interface coupled to a network. The heuristic analyzer(s) 314a . . . 314n, the historical resolutions storage device 324, the logical decision block 316 and the resolution action block 318 may either be embodied as software (or hardware) or combinations of the foregoing and may further be located on one or more servers (e.g., in an analysis server 102) and/or one or more computing devices. For example, the heuristics analyzer(s) 314a . . . 314n may be embodied within a server that communicates over a network with the historical resolutions storage device 324 that is located on a separate server. Various alternative topologies would be readily apparent to one of ordinary skill given the contents of the present disclosure.

Exemplary Methods

Figure 4:
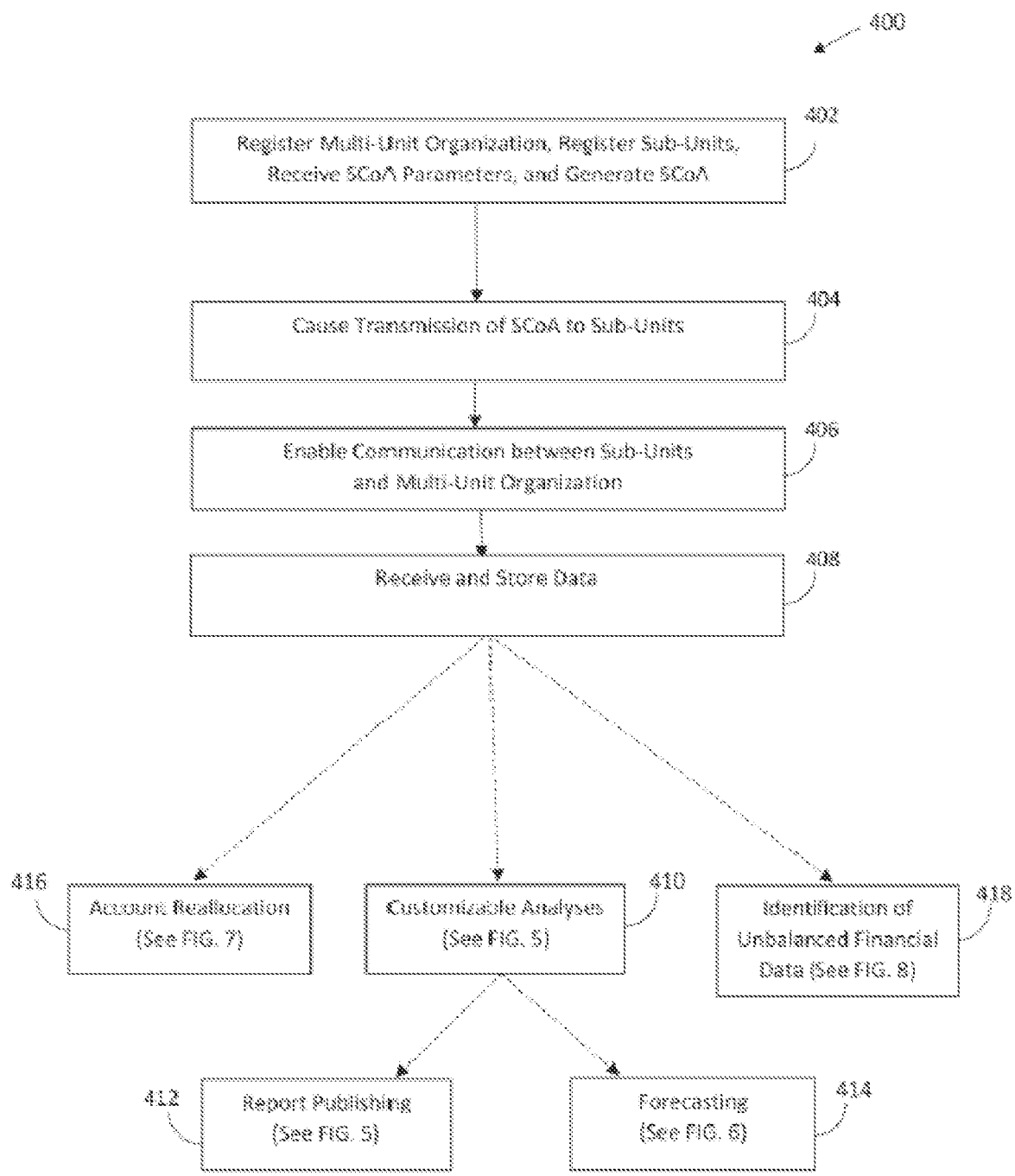
FIG. 4 is a logical flow diagram of one embodiment of a method of data collection, customizable analyses, report publishing, forecasting, account reallocation and identification of unbalanced financial data in accordance with the principles of the present disclosure.

Referring now to FIG. 4 an exemplary methodology 400 for utilizing the various applications executed by the analysis server 102 are illustrated for purposes of facilitating the overall understanding and use of the methodologies described herein. It will be appreciated that while a specific sequence of steps is illustrated, these descriptions may be modified as required by the particular application. Certain steps may be rendered unnecessary or optional under certain circumstances. Additionally, certain steps or functionality may be added to the illustrated method, or the order of performance of two or more steps permuted. All such variations are considered to be encompassed within the contents of the present disclosure.

At step 402, a multi-unit organization is registered (e.g., a user profile is created and stored), various ones of the sub-units of the multi-unit organization are registered (e.g., a user profile that includes various characteristics of the sub-units are created and stored), SCoA parameters are received from, for example, a multi-unit organization computing device, and a SCoA is generated. Next, at step 404, the SCoA is transmitted to computing devices associated with, for example, various sub-units within the multi-unit organization. Next, communication of data to and from the analysis server 102 for each sub-unit and the multi-unit organization are enabled at step 406. Data in, for example, CoA data tables that are normalized to the SCoA are received and stored at step 408. Alternatively, data may be received from each of the sub-units and normalized to the SCoA at the analysis server 102. Steps 402-408 may be carried out by, for example, the registration application 212 (FIG. 2). At step 410, the stored data may be utilized for customizable analyses via the customizable analysis application 414, such as for report publishing at step 412 via the reporting application 216 (FIG. 2), and/or forecasting at step 414 via the forecasting application 218 (FIG. 2). Additionally, expense data may be reallocated across various units via the account reallocation allocation application 220 (FIG. 2) at step 416 and/or unbalanced financial data may be identified via unbalanced financial data application 222 (FIG. 2) at step 418.

Customizable Analyses

Figure 5:
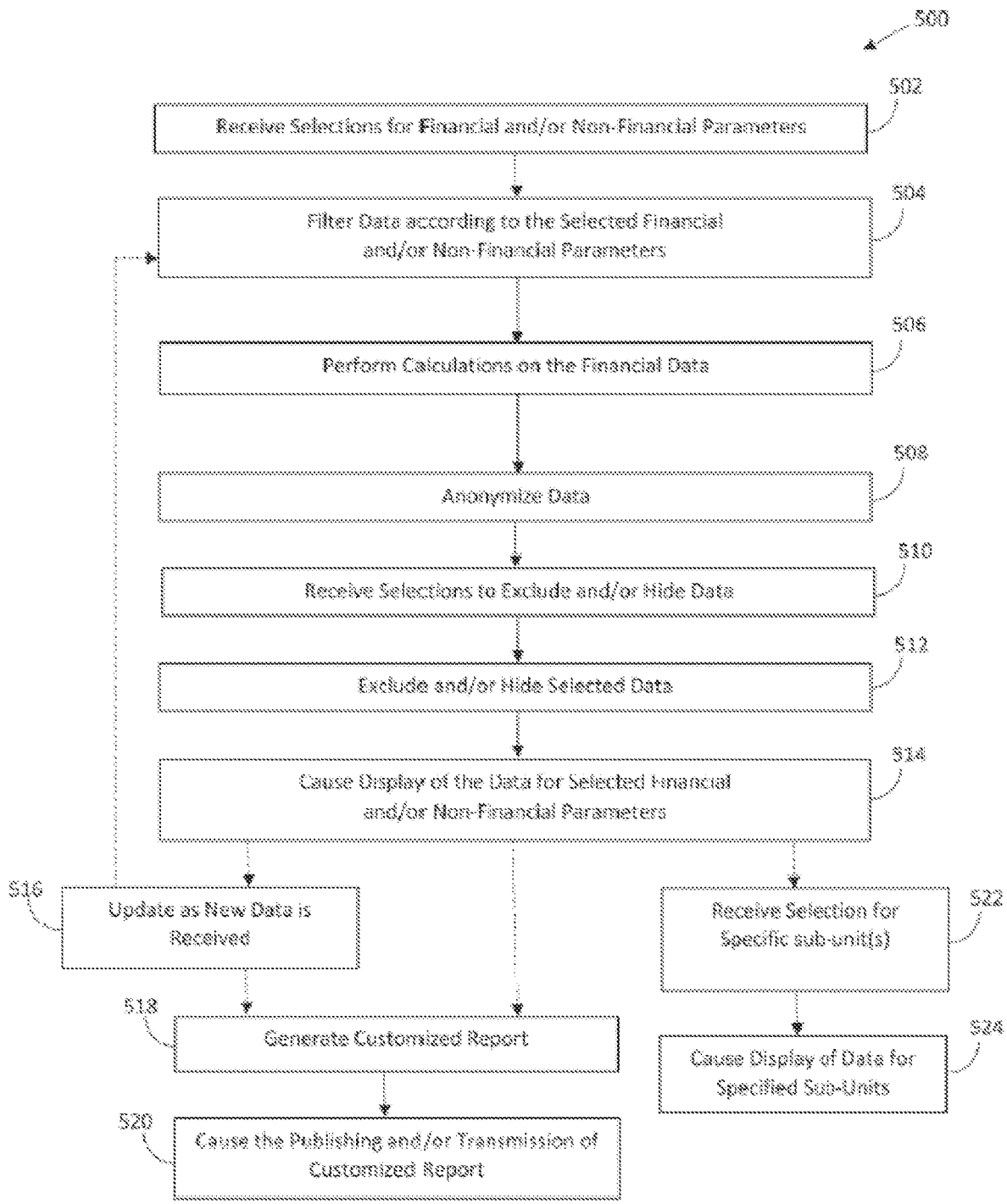
FIG. 5 is a logical flow diagram of one embodiment of a method of providing for customizable analyses and report publishing in accordance with the principles of the present disclosure.

An exemplary methodology 500 for customizable analyses of data stored in, for example, the CoAs for sub-units within a multi-unit organization is shown in FIG. 5. At step 502, user selections are received for various non-financial and/or financial parameters that the user desires to include in an analysis. Additionally, user selections may be received for specified date periods (e.g., data associated with a given month, data associated with a given fiscal quarter, data associated with a given fiscal year, etc.). As but one example, a given sub-unit (e.g., franchisee) or multi-unit organization (e.g., franchisor) may select various metrics in order to determine the relative health for the given sub-unit. For example, a franchisee may sort through other franchisee data based on the number of drive-thru lanes associated with the franchisee. Accordingly, where a franchisee, such as a fast food restaurant, only has a single drive-thru lane, the given franchisee may select other franchisees with a single drive-thru lane for the purpose of, for example, peer benchmarking.

As but yet another example, a given franchisee may sort through other franchisee data based upon the types of products and/or services offered by that given franchisee. For example, a first franchisee may have products X, Y and Z to sell while a second franchisee may have products A, Y and Z to sell and a third franchisee may also have products X, Y and Z to sell. Accordingly, the first franchisee may select parameters X, Y and Z for the purposes of comparison, thereby excluding the second franchisee data. Accordingly, by selecting various financial and/or non-financial parameters, one may more readily compare "apples-to-apples" when, for example, benchmarking their financial data across sub-units or franchisees.

Other selectable parameters may include, without limitation, sub-unit identification; the region/location of the sub-unit; population density surrounding the sub-unit; founding date of the sub-unit; sub-unit representative and/or consultants; number of service stations available in the sub-unit (e.g., number of bays, drive-thru lanes, drive-thru windows, number of cash registers, number of service counters, etc.); number of employees; employee benefits for the sub-unit; average number of customers; square-footage of the sub-unit site; and/or any other financial and/or non-financial parameter that may be applicable to the type of business conducted by the units.

Furthermore, a user may select from, inter alia, various financial parameters such as, for example, performance degree of its peers (e.g., top 10% of sub-units, top 20% of sub-units, bottom 10% of sub-units, bottom 20% of sub-units, etc.); gross income range or threshold for the sub-unit; net income range or threshold for the sub-unit; and/or any other financial and/or non-financial parameter that may be applicable to the type of business conducted by the sub-units. These and other selectable financial and/or non-financial parameters would be readily understood by one of ordinary skill given the contents of the present disclosure.

At step 504, financial data is filtered according to the selected financial and/or non-financial parameters selected at step 502. In other words, a user may select financial and/or non-financial parameters in order to limit and/or filter data from the identified sub-units for viewing and/or inclusion in customizable analyses. For example, a user may include CoA data from the identified one or more sub-units or units based on one or more non-financial parameters such as for example, a specified time period, data categories associated with non-financial features (e.g., number of customers, customer demographics, number of on-line purchases, number of on-site purchases, employee turn-over rate, etc.), analysis/reporting type (e.g., peer benchmarking, ranking, customized forecasting, etc.), and/or any other parameter that may be applicable to the type of business conducted by the units. Further, a user may include CoA data from the identified one or more sub-units or units based on one or more financial parameters such as, for example, profit and loss statements, balance sheets, cash flow statements, sales by customer, expense by vendor, accounts receivable (A/R) aging, accounts payable (A/P) aging, key performance indicators (KPIs), and/or any other financial parameter that may be applicable to the type of business conducted by the sub-unit.

After receipt of selections and the filtering of data according to the received selections, at step 506, any necessary manipulations or calculations are performed. For example, KPIs and/or averages of financial and/or non-financial data for a given sub-unit's peers may be performed. Optionally per step 508, data may be anonymized as necessary depending on, for example, the reporting type and/or user administrative level. For example, a user associated with a specific sub-unit who selects a peer benchmarking analysis (i.e., comparison to averaged data of other units within the multi-unit organization) may have permission to only see financial data associated with his/her specific sub-unit. Accordingly, although averaged data from the other sub-units are displayed, such data is anonymized (i.e., no specific indication of which sub-units associated with the data are displayed). In other words, by anonymizing the data, a given sub-unit may, for example, benchmark its financial numbers with its peers without compromising the privacy of its peer's financial data. Alternatively, a user associated with a sub-unit or a multi-unit organization may have permission to view financial data from all sub-units within the multi-unit organization, and thus data anonymization at step 508 is rendered unnecessary.

Additionally, per step 510, selections may be received to exclude and/or hide data and the corresponding data is then excluded and/or hidden in the analyses, calculations, and/or reporting at step 512. In one exemplary embodiment, so-called outlier data may be selected for exclusion from analysis. In one specific example, it may be desirable to exclude, for example, CoA data from sub-units which are either unusually high performing and/or unusually low performing units in order to, inter alia, prevent the skewing of CoA data from otherwise healthy sub-units. In other words, those units having a deviation from the mean greater than a given threshold value may be excluded from the calculation of compared data (e.g., averaged data). In another exemplary embodiment, specific CoA values may be hidden so as to exclude these values from being reported to other entities. In one such specific example, a sub-unit may have non-reportable data included in their CoA, which they are not otherwise required to share or otherwise do not desire to share with, for example, the multi-unit organization. Accordingly, in this example, specific data values (e.g., cash balances, etc.) may be hidden while still displaying or reporting other data values (e.g., total sales, total expenses, etc.).

At step 514, the analyzed data is displayed based upon the selections received from the user and the corresponding computer operations that occurred at steps 502-512. Optionally, the selected analyses and/or calculations may be saved by the user and automatically updated and revisited as new applicable financial data is received at step 516. In this fashion, financial data used to, for example, benchmark a sub-unit's performance against its peers may be dynamically updated resulting in almost instantaneous feedback for judging the performance of the sub-unit.

At steps 518 and 520, a customized report may optionally be generated from the selected analyses and/or calculations, and the generated report may be subsequently transmitted and/or published. In one exemplary embodiment, sub-unit specific data may be shown/summarized in a generated report using, for example, the logical architecture illustrated in FIG. 3. A user associated with a sub-unit may generate a sub-unit specific report (including, e.g., all or some CoA data for the sub-unit) which is transmitted to or published for viewing by various other sub-units and/or the multi-unit organization itself. In another exemplary embodiment, a user associated with the multi-unit organization may generate a generic customized report which may be transmitted for use within each sub-unit/unit. In one such implementation, the user associated with the multi-unit organization may generate a generic report of KPIs for monitoring by each of the sub-units/units. The generic report may then be transmitted to each of the sub-units/units within the multi-unit organization for internal monitoring and/or reporting to the multi-unit organization.

Also, optionally, at steps 522 and 524, a selection of a specific sub-unit may be received and, in response, detailed financial data of the selected sub-unit is displayed. In one example, a user associated with the multi-unit organization or a sub-unit may view a summary of CoA data for all sub-units within the multi-unit organization (e.g., such as gross income, net income, etc.) via a customized analysis (steps 502-514). In such an example, the user may select to view detailed financial and non-financial data (e.g., product related expenses, employee related expenses, cash sales, credit sales, etc.) of a unit of interest (e.g., a high performing unit, a low performing unit, etc.). Through the use of the customizable analyses tool as depicted with the generalized methodology of FIG. 5, a user may be able to rapidly generate customizable reports (e.g., within a few seconds or minutes), through the use of anonymized data that may be exclusively controlled by the associated individual sub-unit. By virtue of the fact that this anonymized data may be exclusively controlled by the associated individual sub-unit, the sharing of information for the benefit of the overall health of the multi-unit organization may be facilitated.

Additionally, using the logical structure depicted in, for example, FIG. 3 one may also properly format the display of data at step 514 in order to, inter alia, make an "apples-to-apples" comparison of accounting data in order to generate the desired customizable report. For example, the methodology of FIG. 5 may filter data according to the selected financial and/or non-financial parameters at step 504. However, the precise formatting of this filtered data may vary from entity to entity. Accordingly, using the logical structure in FIG. 3 may enable the provision of the filtered data in a format that could be, for example, structured according to a given entities formatting structure quickly and in an automated fashion.

Forecasting

Figure 6:
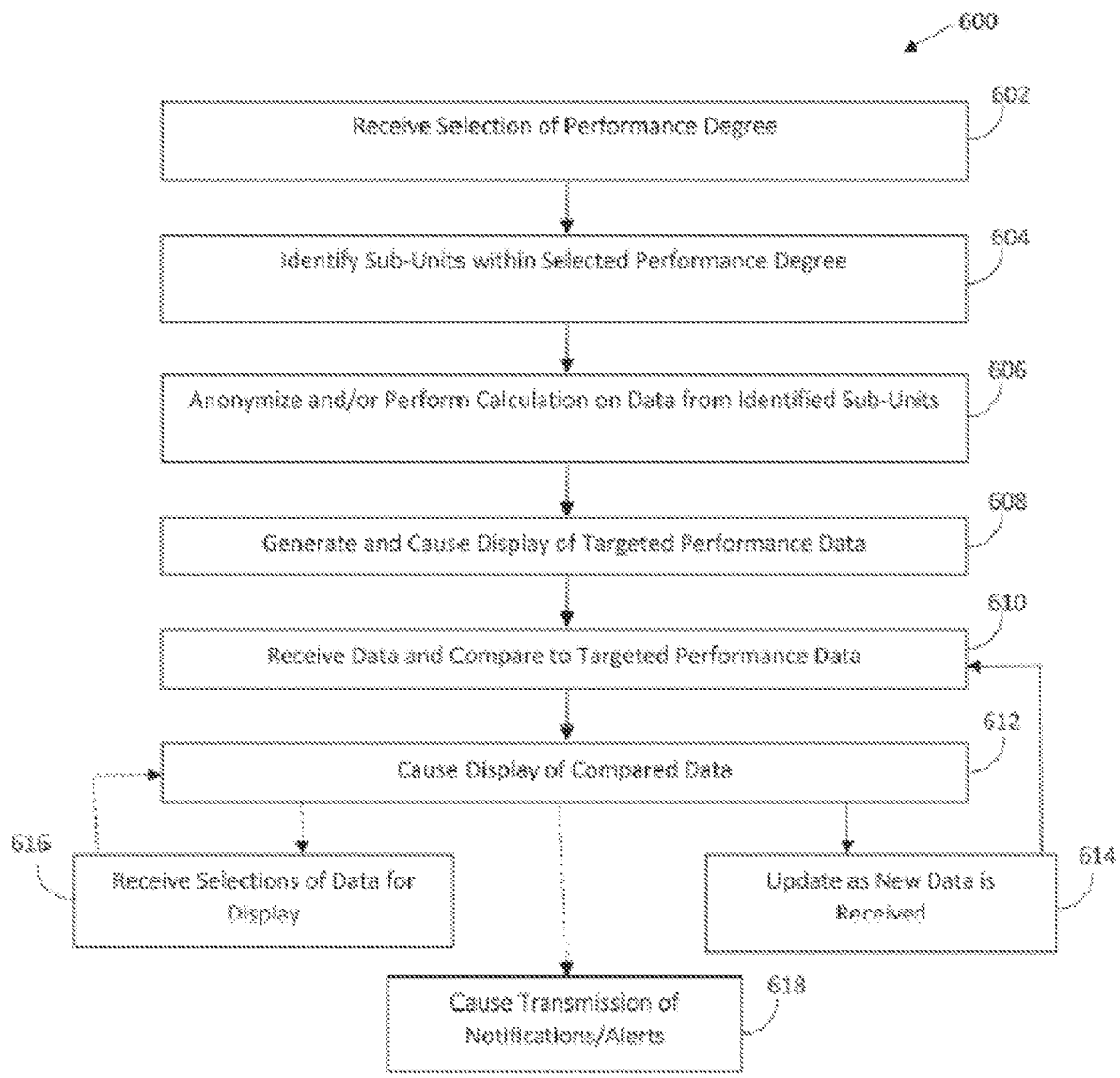
FIG. 6 is a logical flow diagram of one embodiment of a method of data forecasting in accordance with the principles of the present disclosure.

Turning now to FIG. 6, a method 600 for carrying out customized forecasting analyses for a sub-unit is shown and described. At step 602, selections of a performance degree as well as other financial and/or non-financial parameters are optionally received from a user associated with a sub-unit. For example, a user may select a performance percentage (such as e.g., top 5%, top 10%, top 20%, etc.) and other financial and/or non-financial parameters (such as those discussed elsewhere herein).

In response to the received user selections at step 602, at step 604 units within the specified performance degree are identified. For example, at step 602 if a user desires to identify each of its peers that have statistically had comparable financial data (e.g., the top 20% of performers for a given multi-unit organization), each of these peers' financial data may be identified at step 604.

At step 606, each of the peer sub-units identified at step 604 may have their data anonymized and/or their data may be manipulated and/or calculated in order to, for example, provide an average or mean value for various financial parameters associated with a CoA or SCoA. As previously discussed above, the anonymization of this financial data facilitates the sharing of this information with not only the other individual sub-units, but also with the multi-unit organization itself. In other words, as this provided data may be exclusively controlled by its respective sub-unit, the sub-units may be willing to more willingly share this data for the purposes of improving the overall health of the multi-unit organization. For a selected peer sub-unit group an average or mean value of each of these sub-units is calculated for, for example, the selected peer sub-unit group profit & loss statements (P&L statements); the selected peer sub-unit group balance sheet data; the selected peer sub-unit cash flow statements; various KPI indicators and ratios; accounts receivable (A/R) aging reports for the selected peer sub-unit group; accounts payable (A/P) aging reports for the selected peer sub-unit group; sales by customer data for the selected peer sub-unit group; expense by vendor data for the selected peer sub-unit group, etc.

Accordingly, at step 608 this calculated financial data may be generated and displayed to a user in, for example, an anonymized (or non-anonymized) form. In other words, targeted performance data is shared with a user of the forecasting application 218 (FIG. 2).

Next, at step 610, financial data (e.g., CoA and/or SCoA financial data) is received by the analysis server 102 from the requesting sub-unit and the financial data is compared with the targeted performance data generated at step 608. The compared financial data is then displayed to the user at step 612. For example, received data totals may be compared to targeted performance data totals. Further, a cumulative daily performance target may be compared to cumulative received data daily totals. Moreover, by taking the requesting user's prior year financial data, their then-existing financial data, and comparing this data with targeted performance data forecasting data may be generated for the requesting user over a predetermined period of time (e.g., days, weeks, months, etc.).

As new CoA data is received, comparisons of received data to targeted performance data are automatically updated at step 614. Optionally, at step 616, user selections for viewing data are received. For example, a user may select to view specific then current financial data as compared with a previously determined forecast of data and optionally update their forecast accordingly. In another example, a user may select to view only data that is behind a given performance target. In other words, where a multi-unit organization (e.g., franchisor) designates a KPI for one or more of its sub-unit(s) (e.g., franchisee(s)), a user of the forecasting application 218 (FIG. 2) now has the ability to "drill down" in order to determine why a designated KPI has (or hasn't) been met.

For example, the multi-unit organization may have designated a KPI of a designated wage per employee. The requesting sub-unit may determine that it hasn't met this specified targeted performance at step 612 as well as determine the reasoning behind why this designated KPI was not met (e.g., that this designated wage per employee is higher than expected as a result from an unexpectedly large number of overtime hours for this particular sub-unit). In this manner, not only does the analysis server 102 (and in particular the forecasting application 218 (FIG. 2)) provide real-time accurate forecasting data for a given sub-unit, the analysis server 102 also provides a management tool in order to quickly decipher through voluminous amounts of financial data and determine the root causes behind why a performance target is or isn't being met. Herein lies a salient advantage of the analysis server 102 as described herein as compared with prior art financial accounting methods, namely by providing a given sub-unit the ability to determine in near real-time the reasoning behind exceeding or missing designated KPIs so as to enable the given sub-unit to take corrective action immediately.

Accordingly, at step 618, notifications and/or alerts may be transmitted to a user computing device associated with the requesting sub-unit/unit. For example, a notification may be transmitted to the user computing device in response to the received cumulative CoA data being behind the cumulative daily performance target. In another example, a notification may be transmitted periodically (e.g., daily, bi-weekly, weekly) of compared data for selected financial data.

Additionally, using the logical structure depicted in FIG. 3 one may, for example, also properly format the display of data at step 612 in order to, inter alia, make an "apples-to-apples" comparison of the compared accounting data in order to generate the desired forecasting report. For example, the methodology of FIG. 6 may anonymize and/or perform calculation on the data from identified sub-units at step 606. However, the precise formatting of this data may vary from entity to entity. Accordingly, using the logical structure in FIG. 3 may enable the provision of the anonymized data in a format that could be, for example, structured according to a given entities formatting structure quickly and in an automated fashion.

Account Reallocation and Unbalanced CoA Identification

Figure 7:
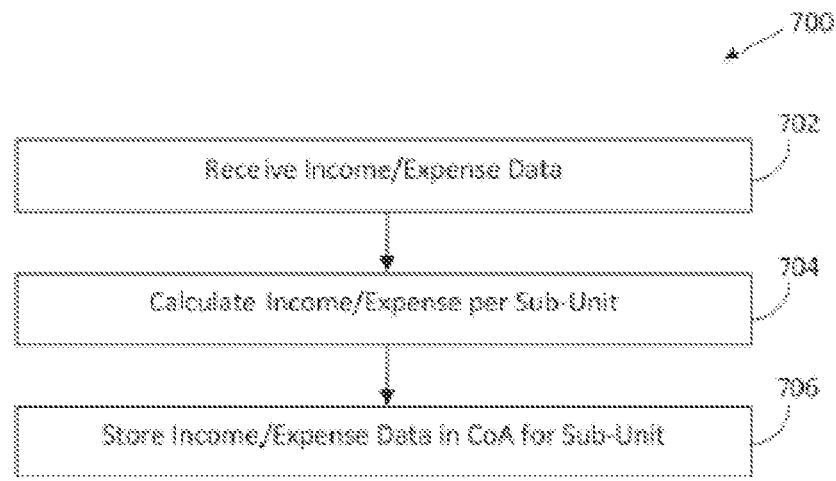
FIG. 7 is a logical flow diagram of one embodiment of a method of account reallocation in accordance with the principles of the present disclosure.
Figure 8:
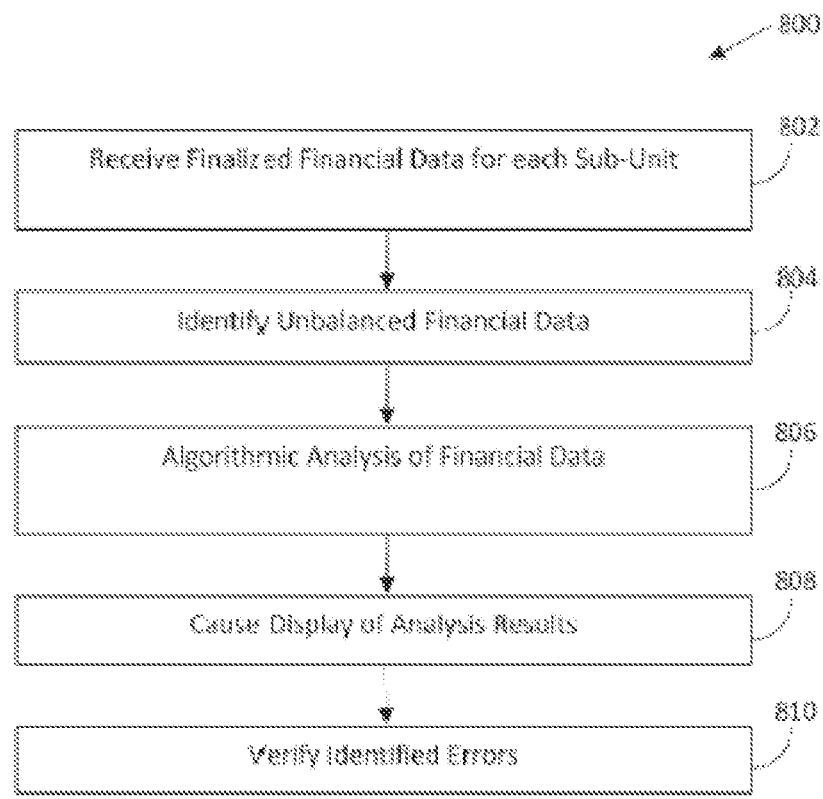
FIG. 8 is a logical flow diagram of one embodiment of a method of unbalanced financial data identification in accordance with the principles of the present disclosure.

FIGS. 7 and 8 include methodologies 700 and 800, for account reallocation using the account reallocation application 220 (FIG. 2) and unbalanced financial data using the unbalanced financial data application 222 (FIG. 2), respectively.

Specifically, as shown in FIG. 7, the reallocation of income/expense data is shown and described. At step 702, income/expense data is received by, for example, a multi-unit organization with the income/expense data being incurred for the benefits of its sub-unit organizations. For example, a multi-unit organization might incur an expense for goods or services with these goods or services ultimately being utilized for the benefit of individual sub-units. Exemplary goods may include, for example, food supplies, cleaning supplies, goods for sale by the sub-units, etc. Exemplary services may include, for example, advertising expenses, outside vendor services, multi-unit organization provided services, etc.

At step 704, the expense data is calculated per sub-unit. In one example, expense data per unit is calculated by dividing expense data by the number of receiving units. For example, where the multi-unit runs an advertisement campaign within a given geographical location, each of the sub-units within the given geographical location is allocated the advertisement expense on a per unit basis. For example, if a multi-unit organization decides to run a $100K advertising campaign within a geographical area where twenty sub-units are located, each of these sub-units is allocated $5K in expense for this advertising campaign (i.e., $100K/20 sub-units=$5K in expense per sub-unit).

In yet another example, expense data per unit may be calculated based on respective features of each sub-unit as opposed to the number of sub-units themselves. For example, where orders for a drive-through lane are taken off-site, the expense for these off-site employees may be allocated to each of the sub-units based on, for example, the number of orders taken at a given sub-unit, or the number of drive-through lanes at a given sub-unit (e.g., sub-units with two drive through lanes are allocated twice as much in expense as a sub-unit with only a single drive-through lane, etc.).

In yet another example, where janitorial services are provided by the multi-unit organization, the costs for these janitorial services may be allocated to each sub-unit based on the square footage of a given sub-unit location, or where these janitorial services are solely related to a specific function of the sub-unit (e.g., for cleaning a bathroom), these expenses may be allocated on a per-toilet, per-sink, per-urinal, etc., basis. These and other expense data per unit may be readily calculated based on respective features associated with each sub-unit as well as, for example, the underlying basis for how these incurred expenses are calculated.

At step 706, these calculated expenses per sub-unit are allocated and stored as expense data within, for example, respective CoAs associated with each sub-unit. In this manner, account reallocation can occur seamlessly, whether this account data is an expense or income, and the respective CoAs are updated accordingly.

Additionally, using the logical structure depicted in FIG. 3 one may, for example, also properly format the calculated expenses per sub-unit at step 706 in order to, inter alia, ensure an "apples-to-apples" comparison of accounting data in order to calculate the desired expense per sub-unit while also, for example, taking into consideration the reporting structure for a given sub-unit. For example, the methodology of FIG. 7 may calculate income/expense data per sub-unit at step 704. However, the precise formatting of this calculated data may vary from entity to entity. Accordingly, using the logical structure in FIG. 3 may enable the provision of the calculated income/expense per sub-unit in a format that could be, for example, structured according to a given entities formatting structure quickly and in an automated fashion.

Referring now to FIG. 8, a method for identifying unbalanced financial data 800 using the unbalanced financial data application 222 (FIG. 2) is shown and described in detail. At step 802 financial data is received for each sub-unit. This financial data could include, for example, CoA data or SCoA data.

At step 804, the data received at step 802 is processed in order to identify any unbalanced financial data. For example, financial data may be processed and it may be determined that assets do not equal liabilities, where they otherwise should be.

In response to identification of such unbalanced financial data, the data may be further processed via algorithms and the like to detect and identify common error types (e.g., transposed digits, misplaced decimal point, etc.) at step 806.

Results of the identification of unbalanced financial data and any detected common error types are then displayed at a requesting user device at step 808. Optionally, common errors may be corrected after verification is received from the user device (i.e., after a user has confirmed the error is due to the identified common error) at step 810.

Additionally, using the logical structure depicted in FIG. 3 one may also, for example, properly format the display of data at step 808 in order to, inter alia, ensure the display of unbalanced financial accounting data is presented in a manner that is compatible with the formatting structure for, for example, a given sub-unit. For example, the methodology of FIG. 8 may identify unbalanced financial data at step 804. However, the precise formatting of this data may vary from entity to entity. Accordingly, using the logical structure in FIG. 3 may enable the provision of the analysis results at step 808 in a format that could be, for example, structured according to a given entities formatting structure quickly and in an automated fashion.

Exemplary Usage Scenarios

Exemplary usage scenarios for the analysis server 102 architecture depicted in FIG. 3 are now referenced by way of non-limiting examples. A desired report template 306 is depicted by Table 1 referenced below. The desired report template 306 illustrated in Table 1 referenced below illustrates two cells of a spreadsheet application in which cell A1 depicts an empty cell followed by cell A2 which depicts a styled cell (i.e., a styled black background).

TABLE 1

| | A |
|---|---|
| 1 | |
| 2 | XXXXXXXX |

As a brief aside, the heuristics analyzer(s) 314a . . . 314n are configured to operate on the cells of a spreadsheet application in a sequential order (e.g., from left-to-right and from top-to-bottom). In the exemplary example illustrated in Table 1, the heuristics analyzers may be run on cell A1 first, followed by cell A2 after, for example, the analysis of cell A1 is complete. During operation, the heuristic analyzers 314a . . . 314n may serve to answer various questions about the entries contained within these cells. Table 2 illustrated below illustrates one exemplary implementation for the questions that may be asked/answered by heuristic analyzers 314a . . . 314n.

TABLE 2

| Analyzer Level | Analyzer Question | Answer | Next Analyzer(s)? | Answer Confidence Level | Command(s) | Command Confidence Level |
|---|---|---|---|---|---|---|
| 1 | Input cell empty? | Yes | End | 50 | None | 50 |
| | | No | Run Level 2 | 10 | None | 10 |
| 1 | Input cell stylized? | Yes | Run Level 2 | 50 | Apply input styling to the output cell | 50 |
| | | No | End | 10 | None | 10 |
| 2 | Text cell? | Yes | Run Level 3 | 50 | Copy text to output cell | 60 |
| | | No | End | 40 | None | 50 |
| 2 | Numeric cell? | Yes | Run Level 3 | 85 | Copy number to output cell | 95 |
| | | No | End | 50 | None | 60 |
| 2 | Formula cell? | Yes | Run Level 3 | 125 | Copy formula to output cell | 135 |
| | | No | End | 100 | None | 110 |
| 3 | Cell an account? | Yes | Run Level 4 | 50 | Apply account formatting | 110 |
| | | No | End | 25 | None | 85 |
| 4 | Header cell? | Yes | Run Level 5 | 100 | Apply header formatting | 210 |
| | | No | End | 75 | None | 185 |
| 4 | Footer cell? | Yes | End | 100 | Apply footer formatting | 210 |
| | | No | End | 75 | None | 185 |
| 5 | Missing accounts? | Yes | Run Level 3 | 200 | Add accounts to the output report | 410 |
| | | No | End | 100 | None | 310 |

Referring now back to Table 1, the process starts by running each of the level 1 analyzers on cell A1. The first level 1 analyzer asks whether the input cell A1 is empty, and since cell A1 is empty, the analysis path ends. As a result, no commands (e.g., possible resolutions and actions 320) are generated and the confidence level is assigned a value of 50 for the first level 1 analyzer. The second level 1 analyzer asks whether the input cell A1 is stylized, and since cell A1 is not stylized, the analysis path ends. As a result, no commands (e.g., possible resolutions and actions 320) are generated and the confidence level is assigned a value of 50 for the second level 1 analyzer. After all analyzers have completed on cell A1, the command(s) to run are evaluated based upon their respective command confidence levels. However, for output cell A1 in this non-limiting example, no data commands and no styling comments have been generated. Accordingly, now that the analyzer path is complete for cell A1, the analyzers are now run on cell A2.

The first level 1 analyzer asks whether the input cell A2 is empty, and since cell A2 is empty, the analysis path ends. As a result, no commands (e.g., possible resolutions and actions 320) are generated and the confidence level is assigned a value of 50 for the first level 1 analyzer. The second level 1 analyzer asks whether the input cell A2 is stylized, and since cell A2 is stylized (i.e., a styled black background), the analysis path next moves on to the level 2 analyzers. In addition, as a result, commands (e.g., possible resolutions and actions 320) are generated to apply the input cell A2 styling from cell A2 to the output cell and the confidence level is assigned a value of 50 for the second level 1 analyzer. The level 2 analyzers are then run, and since input cell A2 doesn't have any text, numbers, or formulas, no other analyzers need to be run on cell A2 with an answer confidence level of 40, 50, and 100, respectively. After all the analyzers have completed on cell A2, the commands are then evaluated based on command confidence levels and potential command conflicts. As the only command generated was for cell A2 to apply styling to the output cell with a confidence of 50, the command to apply the styling from the input cell A2 is applied to the output cell A2 (i.e., a styled black background is applied to the output cell A2) by the resolution action block 318 and the derived report is filled at block 322. The results of this analysis may then be stored in the historical resolutions store 324.

Referring now to FIG. 9, one exemplary accounting structure 900 is shown. As can be seen, the accounting structure is organized into a number of columns (i.e., 'Account Name', 'May-15', 'Jun-15', 'Jul-15', and 'Total '15') and a number of rows (i.e., 'Ordinary Income/Expense', 'Income', 'Unmapped', 'Engine Sales', 'Engine Work', 'Loyalty & Discount', 'MISC Parts Income', 'Service Income', 'Misc Service', and 'Total Service Income'). Various ones of the fields may be formatted in a particular way. For example, the top row is bolded and a bolded line separates the first row from the rows underneath it. Additionally, the last row (i.e., row eleven) is bolded and shaded in. Finally, the last row entry is configured to add up the values in the rows above it. The styling depicted in FIG. 9 is desired to be automatically updated over time.

FIG. 10 illustrates an updated accounting structure 1000 for the exemplary accounting structure shown in FIG. 9. Specifically, as shown in FIG. 10, two new accounts have been added, namely the accounts 'Nissan Sales' and 'Toyota Sales', with their corresponding entries. However, in FIG. 10 it can be seen that the addition of these two new accounts has caused the shaded row to now be placed over the account name 'Service Income', rather than over the account name 'Total Service Income' which was the intended row for the shaded styling. In other words, the shading was automatically incorrectly placed over row eleven as a result of the addition the two new accounting entries 'Nissan Sales' and 'Toyota Sales'.

FIG. 11 illustrates the updated accounting structure 1100 for the exemplary accounting structure shown in FIG. 9; however, the styling structure in this illustrated example contains the desired styling format (i.e., the shading has been automatically provided to new row thirteen). Utilizing the aforementioned analysis server 102 disclosed herein, the styling structure is retained using, for example, the aforementioned heuristic analyzers.

As but another usage scenario, FIGS. 9-11 will now be discussed in the context of FIG. 3 and Table 2 described supra. Specifically, the accounting structure 900 illustrated in FIG. 9 will be used as the desired report template 306. The processing may then proceed through the cells depicted in FIG. 9 from, for example, left-to-right and top-to-bottom. In other words, the heuristic analyzers 314*a* . . . 314*n* may analyze the cell entitled "Account Name", followed by the cell entitled "May-15", followed by the cell entitled "Jun-15", followed by the cell entitled "Jul-15", followed by the cell entitled "Total '15", followed by the cell entitled "Ordinary Income/Expense", etc. Through each of these cells, the heuristic analyzers 314*a* . . . 314*n* will run through the level 1 analyzers, level 2 analyzers, and so on and so forth. The exemplary left-to-right and top-to-bottom methodology of the processing of these cells should be considered exemplary. In certain implementations, other directional attributes for this analysis may be utilized including, for example, right-to-left and bottom-to-top. These and other variants would be readily apparent to one of ordinary skill given the contents of the present disclosure.

As but one non-limiting example, upon encountering the cell entitled "Income", the first level 1 analyzer will ask whether the input cell is empty. As the answer to this question is 'no', the process will advance to the level 2 analyzers and no commands will be generated through the possible resolutions and actions module 320. The second level 1 analyzer will ask whether the cell entitled "Income" is stylized. As the answer to this question is 'no', the process will end, and no additional analyzers will be run with respect to the output of the second level 1 analyzer and no commands will be generated through the possible resolutions and actions module 320, although the level 2 analyzers will now be run as a result of the answer to the first level 1 analyzer. Note that both the first and second level 1 analyzers may be run simultaneous with one another, or alternatively, the first and second level 1 analyzers may be run sequentially. Additionally, the level 2 analyzer may run concurrently with the second level 1 analyzer, or may be run sequentially as well.

Upon initiation of the level 2 analyzers, the first level 2 analyzer will ask if the cell contains text. As the answer to this question is 'yes' (i.e., as a result of the inclusion of the word "Income"), the process will advance to running the level 3 analyzer and the possible resolutions and actions store 320 will generate a copy text command with a command confidence level of 60 which is the sum of the first level 1 analyzer confidence level (i.e., ten (10)) plus the confidence level of the first level 2 analyzer confidence level (i.e., fifty (50)). As the answer to the second level 2 analyzer (i.e., is this a numeric cell?) and the third level 2 analyzer (i.e., is this a formula cell?) is 'no', no additional analyzers will be run with respect to the output of the second and third level 2 analyzers and no commands will be generated.

Upon initiation of the level 3 analyzer, the level 3 analyzer will ask if the cell containing the word "Income" is an account, and as a result will respond with a 'yes'. As a result of this 'yes' answer, the level 4 analyzers will be run and a command to apply account formatting to the output cell will be generated with a confidence level of 110, which is the sum of the prior analyzer confidence level (i.e., 60) plus the confidence level from the level 3 analyzer (i.e., 50). Next the level 4 analyzers will be run. The first level 4 analyzer will ask if the cell is a header cell and will respond 'yes'. As a result of this 'yes' response, the level 5 analyzer will be run and a command to apply header formatting with a confidence level of 210, which is the sum of the prior analyzer confidence level (i.e., 110) plus the confidence level from the first level 4 analyzer (i.e., 100). The second level 4 analyzer will ask if the cell is a footer cell and will respond 'no'. As a result, no additional analyzers will run with respect to the answer to the second level 4 analyzer and no commands will be generated.

Upon initiation of the level 5 analyzer, the level 5 analyzer will ask if there are missing accounts, and as there are two additional accounts to be added (see e.g., "Nissan Sales" and "Toyota Sales" in FIG. 10), the answer will result in a 'yes' and a command to add accounts to the output report with a confidence level of 410 will be generated. Additionally, the level 5 analyzer will trigger a recursive path up to the level 3 analyzers to process the added cells (i.e., cells labeled "Nissan Sales" and "Toyota Sales" along with their associated entries). This process is also depicted by the dotted line in FIG. 3 between the resolution action module 318 and the heuristic analyzers 314*a* . . . 314*n*.

Upon completion of the processing for the "Income" cell, the commands generated through this process will be evaluated based on their command confidence levels and potential command conflicts. In sum, multiple commands have been generated including: (1) the copy text command with a confidence level of 60; (2) the apply account formatting command with a confidence level of 110; (3) the apply account header formatting command with a confidence level of 210; and (4) the add missing accounts command with a confidence level of 410. As no higher confidence copy commands were generated, the copy text command will be run and the cell "Income" will be copied to the output report cell in the filled cell on derived report module 322. Next as the apply account formatting command does not have a higher confidence level than the apply account header formatting command confidence level, the apply account formatting command will be ignored. As there are no higher confidence styling commands generated, the apply account header formatting command will be run and the "Income" cell will be styled as a header account.

Additionally, as there are no higher confidence commands with respect to the add missing accounts command, the add missing accounts command will be run. "Nissan Sales" and "Toyota Sales", along with their corresponding entries will be added to the output report using the filled cell on derived report module 322. The analyzers will then recursively run on the expanded report to process additional, for example, styling or expansion formatting that may be necessary. As a brief aside, the direction that the heuristic analyzers analyze the data, as well as the order in which data is to be filled, may be made at the time of implementation. For example, in some implementations it may be possible to run multiple heuristic analyzers simultaneously. Additionally, these multiple analyzers may not need to traverse in the same direction. For example, some analyzer(s) may benefit from running in a top-to-bottom, left-to-right traversal, while other one(s) of the analyzers may be run simultaneously (or non-simultaneously) in a bottom-to-top and right-to-left traversal as but one non-limiting example.

The processing will then continue cell-by-cell using, for example, the aforementioned left-to-right and top-to-bottom cell analyzing technique. In other words, each cell may proceed according to, for example, the analyzer questions depicted in Table 2 reproduced supra. Upon encountering the footer cell containing "Total Service Income" depicted in FIG. 10, the process will again run through the heuristic analyzers 314a . . . 314n. The first level 1 analyzer will ask if the input cell "Total Service Income" is empty and the answer to this query is 'no'. As a result, the level 2 analyzers will be run and no commands will be generated. The second level 1 analyzer will ask if the input cell "Total Service Income" is stylized and the answer to this query is 'yes'. As a result, the level 2 analyzers will be run and a command to apply input styling to the output cell will be generated with a confidence level of 50.

The first level 2 analyzer will run and determine whether the cell contains text. As the answer to this query is 'yes', the process will advance to running the level 3 analyzers a command to copy text to the output cell will be generated with a confidence level of 60 which is the sum of the previous analyzer path (i.e., 10) plus the first level 2 analyzers confidence level (i.e., 50). The answer to the second and third level 2 analyzers will be 'no' and no additional analyzers will be run with respect to the second and third level 2 analyzers and no commands will be generated. In response to the query of the first level 2 analyzer, the level 3 analyzer will be run. In response to the level 3 analyzer query "Cell an account?" the result of this query will be 'yes'. As a result, the process advances to the level 4 analyzers and a command to apply account formatting to the output cell with a confidence level of 110 will be generated. The confidence level of 110 is resultant from the sum of the prior analyzer confidence level (i.e., 60) plus the confidence level from the level 3 analyzer (i.e., 50).

The first level 4 analyzer is now run with a query regarding whether the cell is a header cell, and the answer to this query will be 'no'. As a result, no additional analyzers are run and no commands are generated. The second level 4 analyzer is now run with a query regarding whether the cell is a footer cell, and the answer to this query will be 'yes'. As a result, no additional analyzers will be run and a command to apply footer formatting is generated with a confidence level of 210. The confidence level of 210 is resultant from the sum of the prior analyzer confidence level (i.e., 110) plus the confidence level of the second level 4 analyzer (i.e., 100). After all analyzers have completed processing the "Total Service Income" cell, the commands are evaluated based on their command confidence levels and potential command conflicts. The commands that were generated for the "Total Service Income" cell are: (1) the apply input styling to the output cell with a confidence level of 50; (2) the copy text command with a confidence level of 60; (3) the apply account formatting with a confidence level of 110; and (4) the apply account footer formatting command with a confidence level of 210.

As the apply input styling to the output cell command doesn't have a higher confidence level than the other styling commands (i.e., apply account formatting command and apply account footer formatting command), the apply input styling command will not be executed. Similarly, the apply account formatting command doesn't have a higher confidence level than the apply account footer formatting command and as a result will similarly not be executed. However, as the apply account footer formatting command is the highest confidence level styling command, the apply account footer formatting command will be executed. As a result, the "Total Service Income" is styled as a footer account based on the footer styling in the desired report template. Additionally, as the copy text command is the highest confidence copy command generated, this command will be run as well, and the text "Total Service Income" will be copied to the output report cell in the filled cell on derived report module 322. The result of this running of the heuristics analyzers 314a . . . 314n may then be stored in the historical resolutions store 324, which may then be utilized for the processing of other desired report templates 306 and other accounting data 302. The resultant styling after the running of the heuristic analyzers 314a . . . 314n for each of the cells will be as depicted in FIG. 11.

Referring now to FIG. 12, another exemplary accounting structure 1200 is shown. Accounting structure 1200 may be utilized as the desired report template 306. The column labeled "Account Name" contains the same information as that generated with respect to FIG. 9; however, the adjacent columns contain columns for the first locations P&L accounting data, the first locations budget numbers, and the differential numbers between the P&L accounting data and the budget numbers. In other words, the budget and differential numbers are not part of the P&L numbers provided by the first location, but they are generated/placed into the accounting structure as either static data (e.g., budget numbers) or calculated data (e.g., the differential numbers).

FIG. 13 illustrates an updated accounting structure 1300 for the exemplary accounting structure shown in FIG. 12. Specifically, two locations of P&L data (e.g., accounting data 302) has been added to the accounting structure for location two and location three. However, because these locations only provide the P&L data, the budget and differential data values for these locations has not been automatically generated as this generated report has not intelligently considered the prior desired formatting style for this type of a report.

Figure 14:
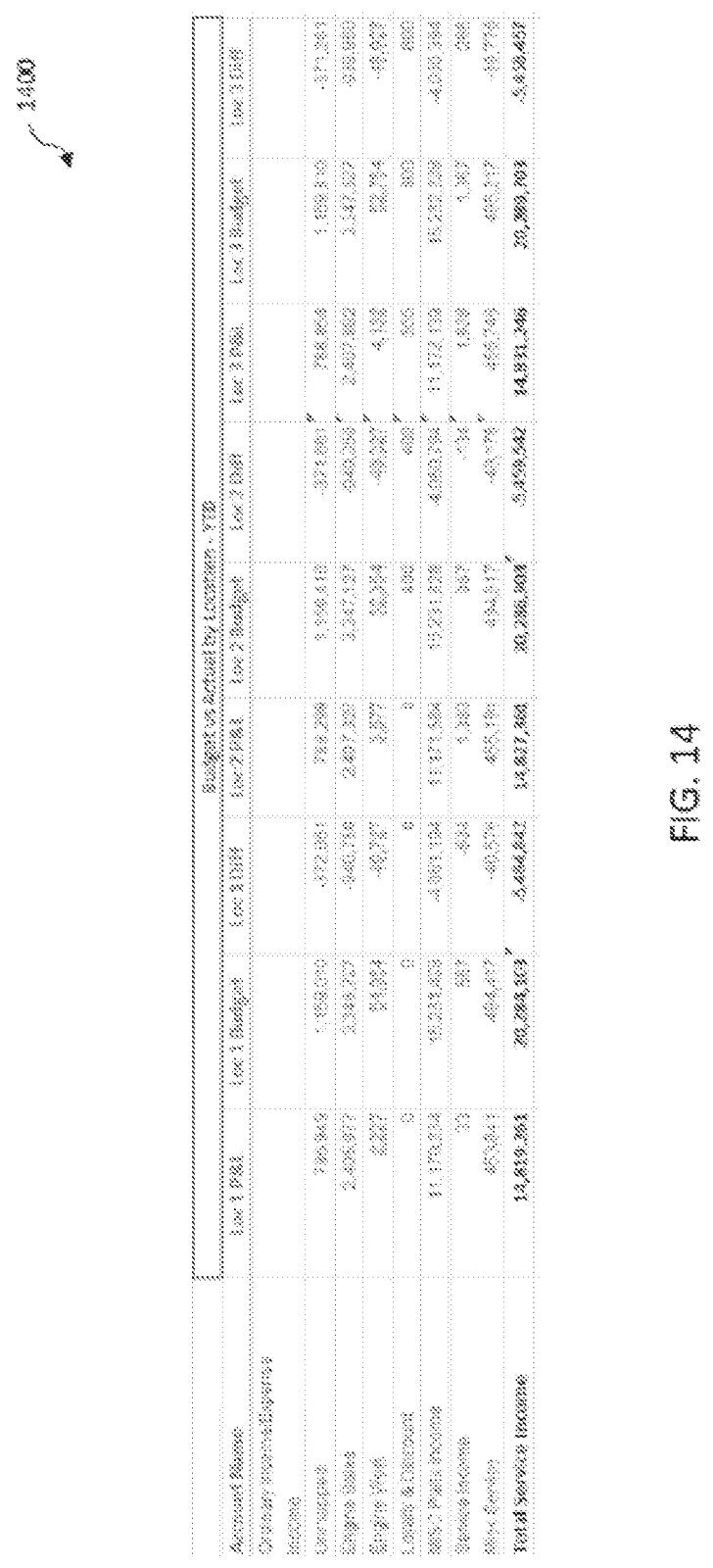

FIG. 14 illustrates the updated accounting structure 1400 for the exemplary accounting structure shown in FIG. 12 after being run on the analysis server 102 depicted in FIG. 3 and utilizing the heuristic analyzers 314a . . . 314n as described with respect to Table 2. In other words, using the aforementioned analysis server 102 depicted in FIG. 3, the styling structure is retained using, for example, the aforementioned heuristic analyzers. This is resultant in part by the fact that the analysis server 102 recognizes that for a location's P&L data, budget columns and differential data columns also need to be added. Accordingly, the analysis server 102 adds this information into the generated report in a repeatable fashion and in the order which was originally desired using information from the accounting structure illustrated in FIG. 12 without necessitating user intervention.

As previously discussed, the analysis server 102 of FIG. 3 is not limited to the derivation of reports for accounting data. In fact, the analysis server 102 of FIG. 3 may be agnostic to the types of data for which data manipulation is performed. For example, the situation depicted in Table 3 reproduced infra may also benefit from the logical structure depicted in FIG. 3. For example, the analysis server 102 of FIG. 3 may be utilized to analyze, process, style, and format, for example, warehouse inventory.

TABLE 3

| | Warehouse Inventory | | | |
|---|---|---|---|---|
| Item | Austin | Dallas | Houston | Total |
| Boots | 32 | 12 | 10 | 54 |
| Dress Shoes | 16 | 25 | 18 | 59 |
| Sneakers | 9 | 0 | 7 | 16 |
| Total | 57 | 37 | 35 | 129 |

For example, if another location (e.g., San Antonio) is added to the warehouse inventory as depicted in Table 3, the analysis server 102 depicted in FIG. 3, may utilize, for example, the heuristics analyzers 314a . . . 314n in a similar fashion as was depicted above with respect to Tables 1 and 2. Additionally, the San Antonio location may include a further classification of items in inventory labeled "Slippers" and accordingly, the automated formatting of Table 4 reproduced infra may be automatically generated as follows.

TABLE 4

| | Warehouse Inventory | | | | |
|---|---|---|---|---|---|
| Item | Austin | Dallas | Houston | San Antonio | Total |
| Boots | 32 | 12 | 10 | 0 | 54 |
| Dress Shoes | 16 | 25 | 18 | 0 | 59 |
| Sneakers | 9 | 0 | 7 | 0 | 16 |
| Slippers | 0 | 0 | 0 | 35 | 35 |
| Total | 57 | 37 | 35 | 35 | 164 |

By way of yet another non-limiting example, the analysis server 102 of FIG. 3 may be further utilized for the automated formatting of, for example, time sheets for the purposes of payroll as depicted by Tables 5 and 6 reproduced infra.

TABLE 5

| Name | Monday | Tuesday | Wednesday | Thursday | Friday | Total |
|---|---|---|---|---|---|---|
| John | 8 | 7 | 9 | 8 | 8 | 40 |
| Mary | 5 | 6 | 4 | 7 | 3 | 25 |
| Jeff | 10 | 8 | 6 | 7 | 9 | 40 |
| Total | 23 | 21 | 19 | 22 | 20 | 105 |

For example, if another employee is added the following week (Paul) that starts work on Wednesday, the payroll formatting may be stylized according to the formatting of Table 5 utilizing the analysis server 102 depicted in FIG. 3. For example, the heuristics analyzers 314a . . . 314n may be utilized in a similar fashion as was depicted above with respect to Tables 1 and 2 in order to automatically generate Table 6 reproduced infra.

TABLE 6

| Name | Monday | Tuesday | Wednesday | Thursday | Friday | Total |
|---|---|---|---|---|---|---|
| John | 8 | 7 | 9 | 8 | 8 | 40 |
| Mary | 5 | 6 | 4 | 7 | 3 | 25 |
| Jeff | 10 | 8 | 6 | 7 | 9 | 40 |
| Paul | 0 | 0 | 8 | 8 | 8 | 24 |
| Total | 23 | 21 | 27 | 30 | 28 | 129 |

While the aforementioned usage scenarios only illustrate either rows or columns being intelligently added to the desired stylized accounting structure, it is appreciated that these additions may in actuality be intelligently combined. In other words, it is recognized that both rows and columns of data may be intelligently added to derive the desired stylized reporting structure. Moreover, while these exemplary usage scenarios only contemplate the addition of data, it is recognized that similar principles may be applied where prior data entries have been removed and/or combined.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A method for formatting data values that may be arbitrary or indeterminate, the method comprising:
using a first stylized reporting structure comprising a first set of data for a second set of data, the first stylized reporting structure comprising a first multi-dimensional data structure, the second set of data comprising a second multi-dimensional data structure that introduces one or more data values that are not included in the first multi-dimensional data structure;
generating a second stylized reporting structure that shares a common stylized reporting structure with the first stylized reporting structure for the second set of data by traversing the second multi-dimensional data structure in a given order using a plurality of heuristic analyzers that are arranged hierarchically, where the hierarchical arrangement comprises an output of a first heuristic analyzer being fed as an input to a second heuristic analyzer, the plurality of heuristic analyzers performing a hierarchical analysis on a per data value basis in the second multi-dimensional data structure in order to determine information associated with respective data values of the second set of data, the hierarchical analysis resulting in a plurality of computer-executable commands; and using the determined information and one or more of the plurality of computer-executable commands to format the second set of data into the second stylized reporting structure that shares the common stylized reporting structure with the first stylized reporting structure.

2. The method of claim 1, wherein the using of the plurality of heuristic analyzers results in an outputting of the plurality of computer-executable commands having a confidence level associated with each one of the plurality of computer-executable commands.

3. The method of claim 2, further comprising determining which ones of the plurality of computer-executable commands possesses a highest confidence level and selectively executing a portion of the plurality of computer-executable commands that possesses the highest confidence level.

4. The method of claim 3, further comprising determining a command type for each of the plurality of computer-executable commands and selectively executing the portion of the plurality of computer-executable commands that possesses the highest confidence level of a given command type.

5. The method of claim 3, further comprising storing results of the using of the plurality of heuristic analyzers into a historical resolutions storage device; and using the stored results contained within the historical resolutions storage device for generation of a third stylized reporting structure comprising a third set of data, the third stylized reporting structure sharing the common stylized reporting structure.

6. The method of claim 3, wherein the performing of the hierarchical analysis on the per data value basis comprises determining one or more of whether a data value is empty, the data value is stylized, the data value is text, the data value is numeric, and/or the data value is a formula.

7. The method of claim 3, wherein the performing of the hierarchical analysis on the per data value basis to determine the information associated with the respective data values of the second set of data comprises using an output from a first heuristic analyzer as an input to a second heuristic analyzer.

8. The method of claim 1, wherein the first multi-dimensional data structure and the second multi-dimensional data structure comprises data represented on a visual display in rows and columns.

9. A computer readable apparatus comprising a storage medium, the storage medium comprising a plurality of computer-executable instructions, the plurality of computer-executable instructions, when executed by a processing apparatus, are configured to:

use a first stylized reporting structure comprising a first set of data for a second set of data, the first stylized reporting structure comprising a first multi-dimensional data structure, the second set of data comprising a second multi-dimensional data structure that introduces one or more data values that are not included in the first multi-dimensional data structure;

generate a second stylized reporting structure that shares a common stylized reporting structure with the first stylized reporting structure for the second set of data by traversal of the second multi-dimensional data structure in a given order using a plurality of heuristic analyzers that are arranged hierarchically, where the hierarchical arrangement comprises an output of a first heuristic analyzer being fed as an input to a second heuristic analyzer, the plurality of heuristic analyzers performing a hierarchical analysis on a per data value basis in the second multi-dimensional data structure in order to determine information associated with respective data values of the second set of data, the hierarchical analysis resulting in a plurality of computer-executable commands; and use the determined information and one or more of the plurality of computer-executable commands to format the second set of data into the second stylized reporting structure that shares the common stylized reporting structure with the first stylized reporting structure.

10. The computer readable apparatus of claim 9, wherein the use of the plurality of heuristic analyzers results in an output of the plurality of computer-executable commands having a confidence level associated with each one of the plurality of computer-executable commands.

11. The computer readable apparatus of claim 10, further comprising determination of which ones of the plurality of computer-executable commands possesses a highest confidence level and selectively executing a portion of the plurality of computer-executable commands that possesses the highest confidence level.

12. The computer readable apparatus of claim 11, further comprising determination of a command type for each of the plurality of computer-executable commands and selectively executing the portion of the plurality of computer-executable commands that possesses the highest confidence level of a given command type.

13. The computer readable apparatus of claim 11, further comprising storage of results of the using of the plurality of heuristic analyzers into a historical resolutions storage device; and use of the stored results contained within the historical resolutions storage device for generation of a third stylized reporting structure comprising a third set of data, the third stylized reporting structure sharing the common stylized reporting structure.

14. The computer readable apparatus of claim 11, wherein the performance of the hierarchical analysis on the per data value basis comprises determination of one or more of whether a data value is empty, the data value is stylized, the data value is text, the data value is numeric, and/or the data value is a formula.

* * * * *